(12) United States Patent
Tereposky et al.

(10) Patent No.: US 8,306,984 B2
(45) Date of Patent: Nov. 6, 2012

(54) SYSTEM, METHOD, AND DATA STRUCTURE FOR PROVIDING ACCESS TO INTERRELATED SOURCES OF INFORMATION

(75) Inventors: Gregory Alfred Tereposky, Ottawa (CA); Daniel Robert Wilton, Ottawa (CA)

(73) Assignee: TLG Partnership, Ottawa (CA)

( * ) Notice: Subject to any disclaimer, the term of this patent is extended or adjusted under 35 U.S.C. 154(b) by 171 days.

(21) Appl. No.: 12/667,430

(22) PCT Filed: Jul. 3, 2008

(86) PCT No.: PCT/CA2008/001215
§ 371 (c)(1),
(2), (4) Date: Jun. 10, 2010

(87) PCT Pub. No.: WO2009/003281
PCT Pub. Date: Jan. 8, 2009

(65) Prior Publication Data
US 2010/0250550 A1    Sep. 30, 2010

Related U.S. Application Data

(60) Provisional application No. 60/947,812, filed on Jul. 3, 2007.

(51) Int. Cl.
*G06F 7/00* (2006.01)
(52) U.S. Cl. .................................................... 707/741
(58) Field of Classification Search .................. 707/736, 707/737, 738, 741
See application file for complete search history.

(56) References Cited

U.S. PATENT DOCUMENTS

| | | | |
|---|---|---|---|
| 5,544,360 A | 8/1996 | Lewak et al. | |
| 6,236,768 B1 | 5/2001 | Rhodes et al. | |
| 6,490,579 B1 | 12/2002 | Gao et al. | |
| 7,983,990 B2* | 7/2011 | Bennett et al. | 705/59 |
| 2004/0002959 A1 | 1/2004 | Alpert et al. | |
| 2005/0027704 A1 | 2/2005 | Hammond et al. | |
| 2006/0136391 A1* | 6/2006 | Morris | 707/3 |
| 2007/0100628 A1* | 5/2007 | Bodin et al. | 704/261 |
| 2008/0071578 A1* | 3/2008 | Herz et al. | 705/3 |
| 2009/0119134 A1* | 5/2009 | Sakaue et al. | 705/4 |
| 2010/0223261 A1* | 9/2010 | Sarkar | 707/726 |

FOREIGN PATENT DOCUMENTS
WO    WO 01/24045 A2    4/2001
WO    WO 2004/099900 A2    11/2004

OTHER PUBLICATIONS

PCT International Search Report corresponding to PCT/CA2008/001215, 3 pages.

* cited by examiner

*Primary Examiner* — Hung T Vy
(74) *Attorney, Agent, or Firm* — Workman Nydegger

(57) ABSTRACT

A system, method, and data structure for storing and accessing interrelated data pertaining to a given subject is disclosed. The system includes a user module and a service module, wherein said service module contains a data storage component. The system facilitates reviewing sources of information that relate to particular subject. Where there sources of information can or must be understood in the context of other sources of information, the present invention also comprises a data structure and method of populating said data structure that facilitates searching and access to any related sources of information. The disclosed invention includes embodiments wherein the sources of information can consist of many different formats. Whereas many user modules can access the service module from any location, searching and accessing of any of said information sources can be reviewed in their full context, as defined by the related sources of information, from any location that has access to the communication medium connecting the user and service modules.

29 Claims, 35 Drawing Sheets

Figure 22

Core Components | Web Pages | Tools | Search & Replace
Master Tree | Document Database | Annotated Agreements | Full Text Search

Master Tree - Article Citator Generator

Node Branches:

Master Tree Feeding AA
    Treaty Interpretation Test
        General
New Association

Select Agreement/Instrument: — select agreement —

Select Provision:

[Submit]

TLG ver2.0 © Copyright 2003-2006. All Rights Reserved.

SYSTEM, METHOD, AND DATA STRUCTURE FOR PROVIDING ACCESS TO INTERRELATED SOURCES OF INFORMATION

CROSS-REFERENCE TO RELATED APPLICATIONS

This application is a National Stage application of PCT/CA2008/001215, filed Jul. 3, 2008, which claims the benefit and priority of U.S. Provisional Application 60/947,812, filed Jul. 3, 2007. The foregoing applications are incorporated by reference herein in their entirety.

FIELD OF THE INVENTION

The present invention pertains to data storage and access systems, and particularly, to a system, method, and data structure for inputting, managing and/or providing access to interrelated sources of information pertaining to a given subject.

BACKGROUND

With the development of the Internet, in concert with other types of cross-border interaction in today's global economy, there has been increased demand for remote access to reliable and searchable sources of information relating to specific esoteric subject areas in specific fields of knowledge such as law, medicine, business, economics, and the like. Users look for such information to be presented in a structured manner that facilitates rapid and reliable comprehension of complex concepts and allows for rapid, highly accurate access to supporting information in order to better research and understand a particular subject.

Given its qualitative nature, the organisation of such information requires the expertise of persons knowledgeable in the specific subject area. Users, who may be well versed in a particular field of knowledge but not necessarily in computer systems and associated data models, must be able to easily and flexibly interact with the data storage, management, and access systems in order to impart their knowledge effectively while allowing others to interact with a system that enables them to easily maintain and comprehend the perpetual evolution of that knowledge in various emerging contexts.

Subject areas, the concepts contained therein, and the relationships between them range from the simple to the very complex and are highly variable. Many such relationships can be described only qualitatively and therefore are not susceptible to automatic recognition by a computer system. Examples of such relationships would be similar or analogous topics, historical relevance, and indirect references.

Many subject areas are knowledge-based systems that rely on previously known information for the incremental creation of new information. In such areas, information within a particular subject area is highly related to the context to which it relates. In many areas of knowledge or research, the context in which the source of information exists may be as or more important than the information itself. Without quick and easy access to related information that assists in defining its context, the full realisation of the meaning of particular information may not be possible.

For example, in international law, the proper understanding of an international treaty depends not only on some pre-existing knowledge of international law, but also on other related treaties and rules of international law (such as the rules of treaty interpretation) as well as on how courts, tribunals and other bodies have interpreted concepts and principles that may not be expressly stated in the text of the treaty itself.

Likewise, context is highly significant to medical diagnosis. Access to physiological and anatomical background information, as well as to ongoing pharmaceutical information and research into other forms of treatment results is often necessary for the correct diagnosis and treatment of medical conditions.

Information related to a particular subject area may also exist in different formats, some of which are not readily accessed for searching and consultation. Examples of such formats include unpublicised or hard to find paper-based texts and papers, computer-based scanned image files of text documents, computer-based read-only document files (such as the common proprietary PDF format) and internet-based files (e.g., HTML).

It has heretofore not been cost-effective to implement systems for inputting and accessing information sources pertaining to given subjects. An implementation of network-based systems that facilitate the locating, addition, and annotation of information sources that reduces the time and effort of data input has long been sought. Furthermore, current methods of database population and implementation for the data input of interrelated documents has resulted in very wide, linear table structures. This, in turn, has slowed database queries and has limited the criteria of relationships between different information sources and structures while placing a considerable strain on database resources (e.g. servers, software, networks) when performing queries that are meant to associate and index, or conversely, locate and display sought information.

Some current methods provide solutions to the demand for access to remotely located and related information by making electronic copies of documents pertaining to a given subject available over the internet by way of internet searching services and hosted web sites providing hyperlinks to electronic copies of documents. These methods are however not particularly efficient for finding reliable sources of information and creating linkage between related sources, nor do they provide a particular means for creating efficient database methods for inputting and accessing those sources that remain fast and reliable. It is true that some publicly available web sites allow users to view documents by clicking on a specific hyperlink, but as the links or link descriptors may or may not give accurate or useful descriptions of the information source, this solution makes the finding of useful information extremely time-consuming. Further, searches are often fruitless as the user must depend on unrelated and potentially unreliable third parties to make information available and provide appropriate descriptions of the available material. Restrictions on data access or data acquisition (i.e. downloading), whether from the content provider or the internet service provider, makes obtaining information from documentary sources impracticable.

Therefore, there is a need for a new system and method for inputting, managing and/or providing access to interrelated sources of information that overcomes some of the drawbacks of known systems.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a system, method, and data structure for providing access to interrelated sources of information. In accordance with an aspect of the present invention, there is provided a system for providing a user module access to interrelated sources of information pertaining to a given subject, the system comprising: a service module comprising a processor; one or more computer readable media for storing thereon a data structure comprising a plurality of data tables for storing the sources of information; a contextual index for associating the interrelated sources of information; and a set of statements and instructions, where, upon execution by said processor, provides for said association of, and access to the interrelated sources of information; and a communication interface for interfacing with the user module and providing thereto access to said associated interrelated sources of information via said contextual index.

In accordance with another aspect of the present invention, there is provided a data storage medium for storing, associating and indexing interrelated sources of information accessible by an application program executed on a computing platform for providing comprehensive access to said interrelated sources of information, the data storage medium comprising: a plurality of data tables for storing the interrelated sources of information; a contextual index for associating the interrelated sources of information based on a set of criteria defining the interrelations therebetween and indexing said interrelations to provide same within a context of each of said sources thereby associated; and a set of statements and instructions for, upon execution by a computer platform, providing said association of, and access to the interrelated sources of information.

BRIEF DESCRIPTION OF THE FIGURES

Figure 25:
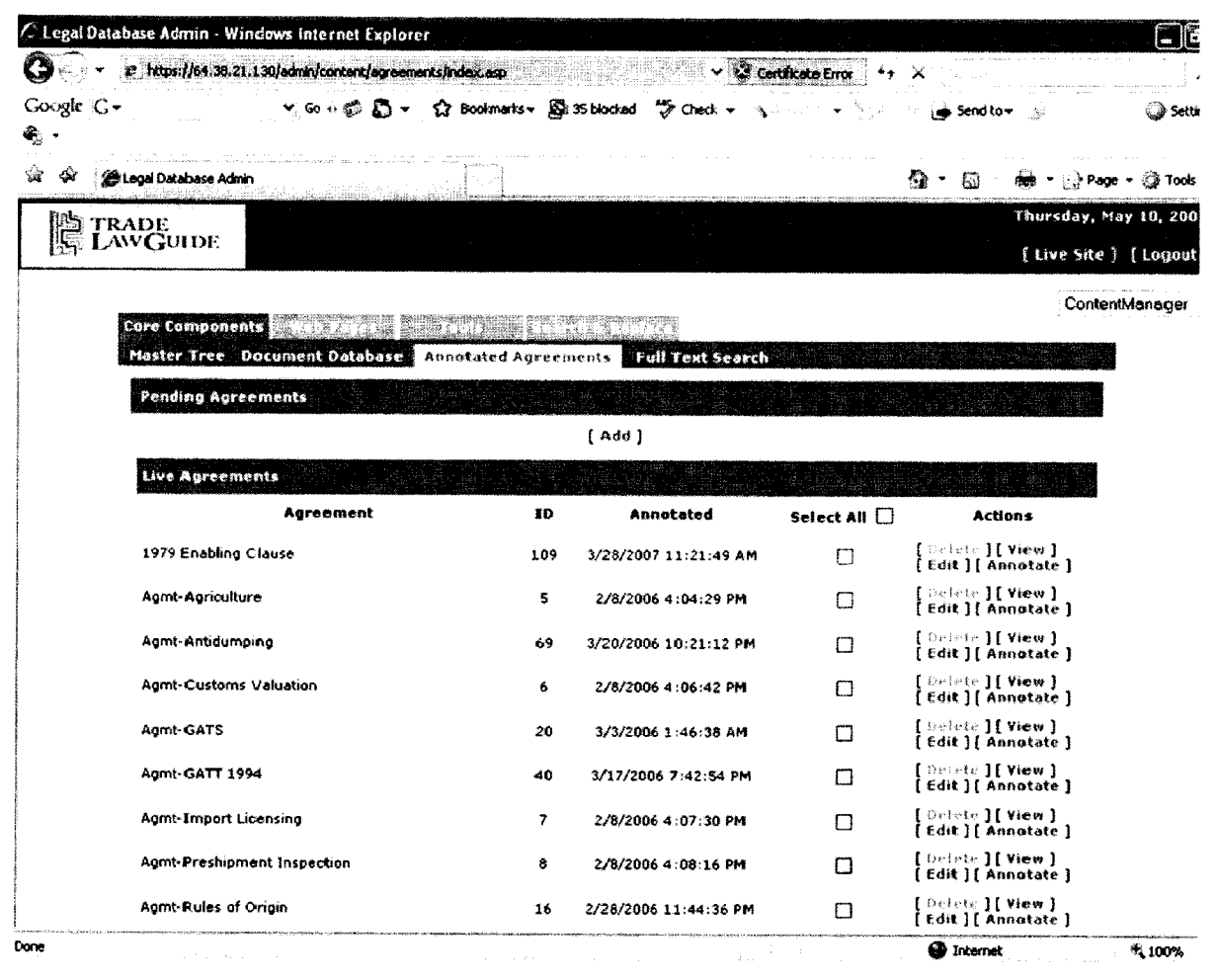

FIGS. 20 to 28 are example screen shots of a graphical user interface provided for the input of data and associations between same via the service module of FIG. 1.

DETAILED DESCRIPTION OF THE INVENTION

Definitions

Figure 1:
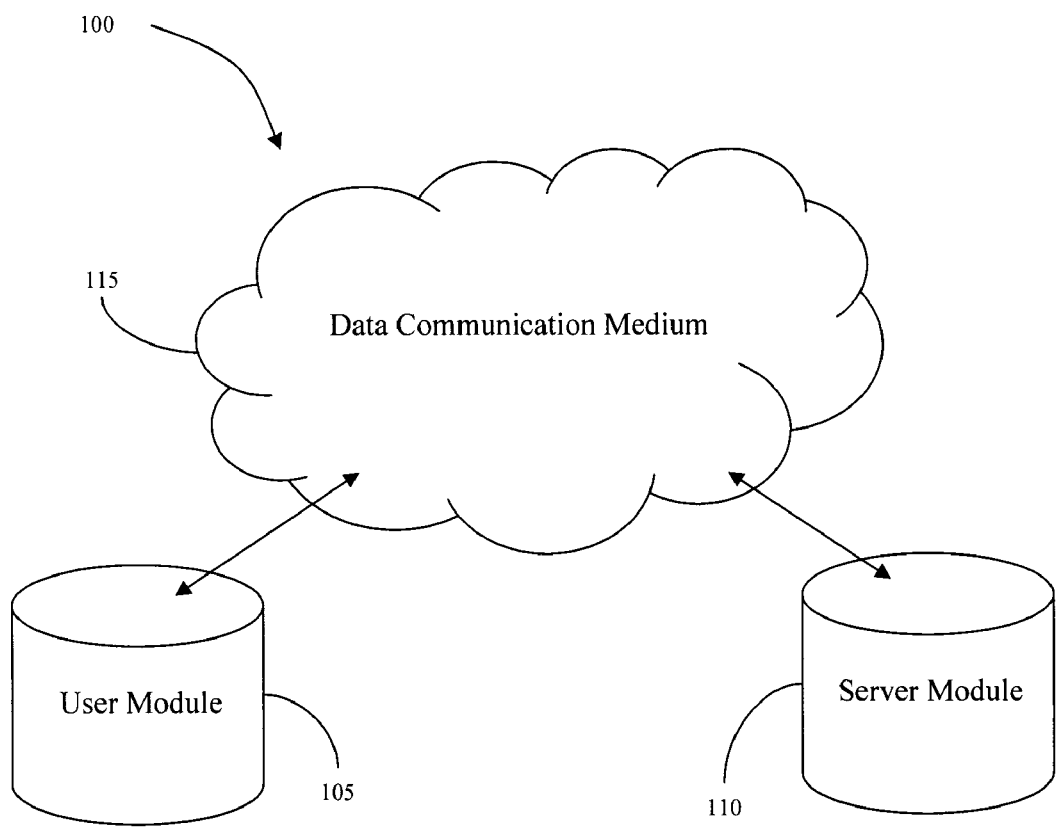
FIG. 1 is a high level diagrammatic representation of a user module communicatively linked to a service module for accessing data therefrom, in accordance with one embodiment of the present invention.

The term "PDF", or Portable Document Format, is a proprietary computer-based file format used for representing two-dimensional documents in a device independent and resolution independent fixed-layout document format. Each PDF file encapsulates a complete description of a document that includes the text, fonts, images, and graphics that compose the document. PDF files will render exactly the same regardless of its origin or destination. PDF files are used to encode the exact look of a document in a device-independent way. While PDF can describe very simple one page documents, it may also be used for many pages, complex documents that use a variety of fonts, graphics, colours, and images.

The term "XML", or Extensible Markup Language, is a computer-based language that is supported by a wide variety of applications, whose primary purpose is to facilitate the sharing of data across different information systems, particularly systems connected via a network and thereby facilitating access to sources of information stored in data storage components located in or accessed by service modules.

The term "ASP", or Active Server Pages, relates to a programming language that enables the creation of dynamic and interactive web pages. ASP provides for service modules to dynamically produce web pages that are independent of the communication and graphical user interface software used in the user module, thereby facilitating access to sources of information stored in data storage components located in or accessed by service modules.

The term "SQL", or Structured Query Language, is the most popular computer language used to create, retrieve, update and delete data from relational database management systems. The language has evolved beyond its original purpose, and now supports object-relational database management systems. MS-SQL, or Microsoft™ SQL Server™, is a relational database management system produced by Microsoft™ Its primary query language is Transact-SQL, which is a proprietary implementation of the SQL language.

The term "HTML", or Hypertext Markup Language, is the predominant markup language for the creation of web pages. This programming language structure enhances the display of ordinary text with rich features for layout, formatting, display, interaction, etc. essentially helping document presentation and interaction in its rawest form across a common platform agnostic browser. HTML includes more complex labelling and displaying of data through scripting and embedding of program files, hidden from the user, but interpreted by the browser through the source code.

Unless defined otherwise, all technical and scientific terms used herein have the same meaning as commonly understood by one of ordinary skill in the art to which this invention belongs.

The present invention provides a system for inputting, managing and/or providing access to interrelated sources of information pertaining to a given subject. The system comprises a service module with a computer readable storage medium which is accessible by a processor associated with the service module. The computer readable storage medium comprises a data structure which includes a plurality of data tables of interrelated sources of information. The computer readable storage medium further includes a contextual index which provides an interconnectivity map between the interrelated sources of information. This format of a system can therefore provide a user with access to the interrelated sources of information, while further providing an interconnectivity route therebetween.

With reference to FIG. 1, the system, generally referred to using the numeral 100 and in accordance with one embodiment of the present invention, comprises one or more service modules 110, for example for the input and/or management of data by a system administrator or the like, and a user module 105 for gaining access to the data via a data communication medium 115 or the like.

In general, the system 100 facilitates the input, management, and/or access to interrelated data, which may, for example, pertain to a particular area of knowledge. The system 100 may further include means for inputting further data related to the nature of the interrelations between data. For instance, the user module 105 may access this data from the service module 110 by communicating therewith over communication medium 115. In one embodiment, the service module 110 is implemented on, or accessed via a network server and the user module 105 is implemented on a remote computing platform comprising communication and user interfaces adapted for facilitating access to this network server. For example, the network server could comprise a Web server and the user module 105 could provide access to the interrelated data via a Web browser or the like. Alternatively, the network server could include a private or public network accessible by the user module 105 via a known or proprietary local or remote network communication means, as will be readily apparent to the person of ordinary skill in the art.

In another embodiment, both the service module 110 and the user module 105 are implemented by a common computing platform configured for interfacing user inputs communicated thereto via an appropriate user interface (e.g. graphical user interface) and interfacing with the service module 110 in response to such inputs. The person skilled in the art will readily understand upon reference to the following description that various other local and/or networked configurations may be considered herein without departing from the general scope and nature of the present disclosure. The person of skill in the art will further understand that although the user and service modules are depicted as separate and single entities, either or both of these modules may comprise a number of software and/or hardware components, configured and operating independently or within a single computing platform, to provide the solutions taught by the present disclosure.

In general, information sources are stored in one or more data structures on the service module 110. Also stored on the service module 110 is a listing of criteria in respect of which potential relationships to and with, for example, issues, other information sources, or categories of historical importance are established between the information sources. In general, this listing of criteria related to the information sources and issues is used to define a contextual index for organising and providing comprehensive access to these sources. User modules 105 communicate with the service module 110 thereby allowing users to easily and quickly access and search information sources, as well as view related topics and information sources in order to fully appreciate the context in which given information source may exist. Users can navigate from issue to information source as established criteria of relationships located on the service module 110 provide for linkage between issues and sources of information.

The service module also provides a means for inputting and storing new data sources. In one embodiment, there are means of defining data sources or locations within data sources that may relate to another data source or a context to which it relates according to criteria. The data which corresponds to the defined data sources or locations within data sources are stored in the computer readable memory of the service module, and is accompanied by other data which corresponds to the criteria through which the relation to other data sources is established. New criteria for relationships can be added or existing criteria for relationships can be used. Additionally, criteria can relate to other criteria. This is accomplished by providing for sub-criteria, or sets of criteria that are more narrow than their parent criteria and relate more specifically to a data source or location within a data source. Criteria can also relate to other criteria by means of cross referencing, thereby extending the contextual link between data sources to include multiple criteria. These relationships between data sources, locations within data sources, and criteria are stored in a contextual index in the computer readable memory.

In one embodiment, annotation information related to a data source or location within a data source is provided by reference to the contextual index. This allows the user module to display all the relationships that may stem from a particular data source or location within a data source. The user module, by reference to the contextual index, can also display all data sources or locations within data sources that are linked to a particular criteria of relationship or description of relationship.

In one embodiment, data corresponding to the relationships that link a data source can be ranked depending on their importance relative to the currently active data source.

In one embodiment, the data tables in which the information sources are stored, and the table indexing method used, are configured such that the desired information sources can be located by the service module 110 and relayed to the user module 105 in real-time. In one embodiment, at least some of these data tables are configured in a vertical fashion thereby further increasing the efficiency of the system. As the user module 105 may be located anywhere, provided the communication interface is communicatively linked to the communication medium, the access and searching of many documents from a location, including that of the service module 110, is provided. Further, in an embodiment configured to provide access to the sources of information via implementation of a contextual index, the system 100 may provide for navigation between multiple issues and information sources, thereby allowing for users to view a given issue or topic in the context of another issue or information source at one time and from a location.

The User Module

Figure 2:
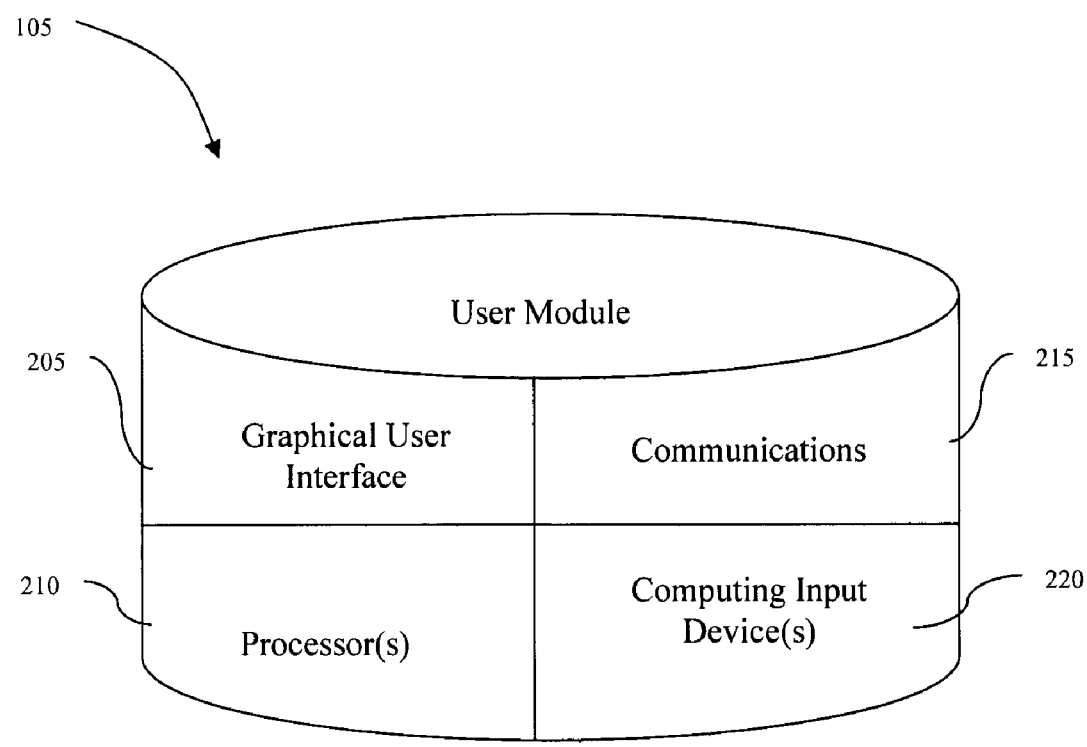
FIG. 2 depicts elements of the user module of FIG. 1.

The user module 105, of which an embodiment is depicted in FIG. 2, is used to communicate data from the service module 110 to the user, and instructions from the user to the service module 110. There can be a plurality of user modules 105 accessing the service module 110 at any one time. Each user module 105 remains substantially completely independent of the other user module 105 that may be communicating with the service module 110 at any one time. In one embodiment, the user modules 105 and service module 110 may be separate and disparately located computers, wherein communication is effected in a secure manner over a world-wide interconnected network of computers, commonly known as the internet.

In the embodiment depicted in FIG. 2, the user module 105 comprises a processor 210 that processes information as received from the user or from the service module 110. The user module 105 also comprises a graphical user interface 205 to display information to the user and facilitate communication of instructions from the user of the user module 105 to service module 110. The user module 105 also generally comprises computing input devices 220, such as a mouse, keyboard or the like, for facilitating the provision of instructions from the user, and allow for the desired display of information, navigation between information sources, as well as the communication of instructions from the user to the service module 110.

In one embodiment, the graphical user interface 205 provides the user with visual access to various services, each of which relate to the access and searching of information sources related to a given subject area. In one embodiment of the present invention, the graphical user interface 205 provides a means of identifying the user by way of name and password to restrict access to the system, various tabs which facilitate switching from service to service, and a number of different ways of presenting the information sources. These different ways of presenting the information may include hierarchical listings with portions of information on each branch, embedded panels containing all or portions of the information sources, or separate panels showing only the desired information source. Example screen shots of the graphical user interface 205, which demonstrate various services and ways of displaying information sources, or portions thereof, as contemplated in various embodiments of the present invention, are shown in FIGS. 6 to 19.

The user module 105, using its communication means 215, communicates with the service module 110 over a communication medium 115. The medium 115 can be the internal circuitry of a computer, as both the user module 105 and the service module 110 may reside on the same computer. The medium 115 may also include an intranet in which the communication medium 115 is a closed group of interconnected computers that does not have external access. The medium 115 may also comprise of a world-wide network of interconnected computers, or the internet. If the medium 115 comprises the internet, then transmission of information may occur in a secure manner, using know or proprietary communication protocols, as readily known to the person of ordinary skill in the art.

The Service Module

Figure 3:
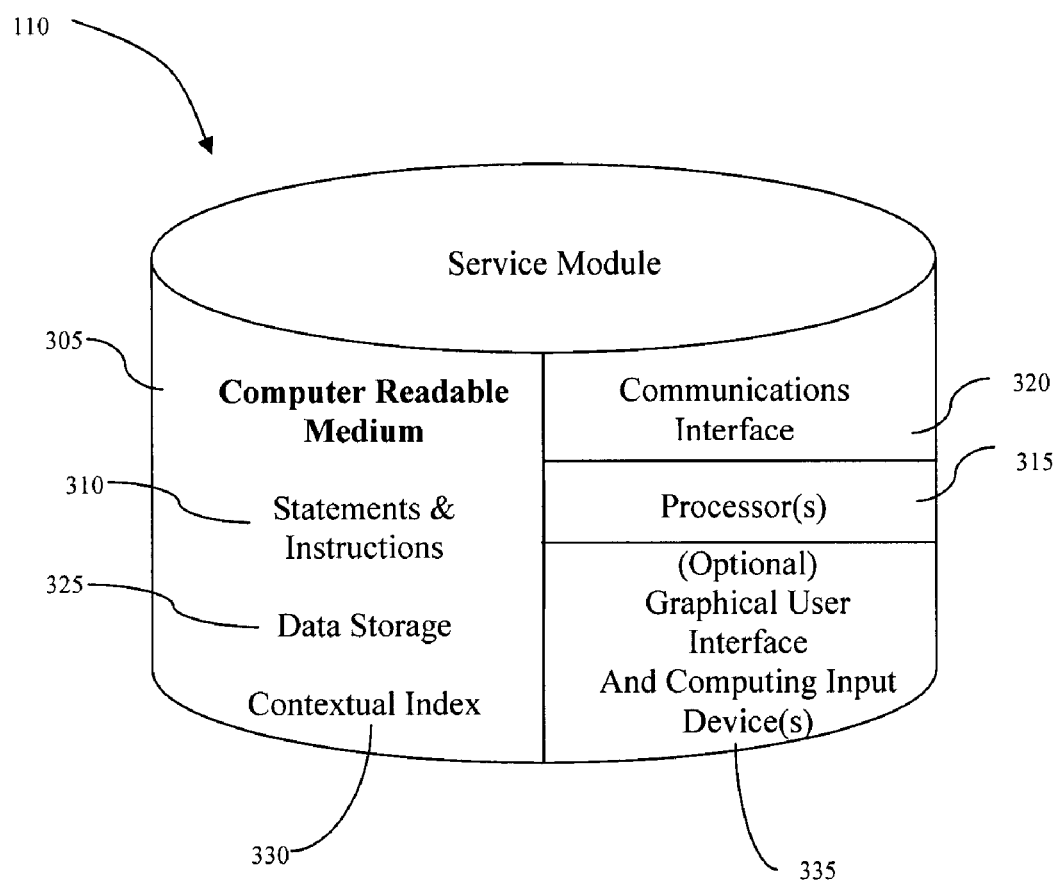
FIG. 3 depicts elements of the service module of FIG. 1.

The service module 110, of which an embodiment is depicted in FIG. 3, comprises a computer or computing platform, or a module implemented therein, comprising of, or configured to have access to one or more processors 315, one or more computer readable media 305 and a communication interface 320 for interfacing with the one or more user modules 105, for example over a local communication bus, a local or remote network, or a public network such as the Internet. The service module may further comprise an optional graphical user interface and computing input device(s) 335 for the input and management of data for access by a user. It will be appreciated that such data input and management may be implemented locally upon the service module device, or remotely via one or more devices adapted and authorised to implemented such managerial and/or administrative actions. For example, data input and/or management could be implemented via one or more of the user modules 105, using an appropriate connection and optionally, via appropriate authentication and authorisation procedures. Example screen shots of the graphical user interface 335, which demonstrate various data input and management services and functions, as contemplated in various embodiments of the present invention, are shown in FIGS. 20 to 28.

In general, the one or more computer-readable media comprise a data storage component 325 for the inter related sources of information, in one example pertaining to a same subject area, in one or more data structures; a set of instructions and/or statements 310 that may be executed by the processor(s) 315 for associating, searching and providing visual access to information located in the data storage component 325; and a contextual index 330 associating the information located in the data storage component 325 thereby establishing and providing relationships between the information sources based on a number of predefined criteria. The data storage component 335 generally comprises, for example as shown in FIG. 4A to 5E, a tabulated data storage structure comprising multiple tables organised relationally, wherein a number of these tables may be organised "vertically" in order to facilitate efficient linkage and location of disparate sources of information by way of related criteria, such as keywords, sources, topics, document types, citations and references, for example. The data structure architecture will be described in greater detail below and with reference to Example 1.

In general, the processor 315 of the service module 110 is used to process information in the form of instructions received from the user module 105 via the communication interface 115. Additionally, the processor 315 executes the set of instructions and statements 310 located on the computer readable medium 305 in order to locate, search, package, and transmit information from the data storage component 325 to the user module 110. The communications interface 320 on the service module 110 relays this information via the communication medium 115 to the user module 105, and may comprise communication hardware and/or software components allowing such data communication, as is readily known in the art.

In one embodiment of the invention, the service module 110 is located in the same computer as the one or more user modules 105. In alternative embodiments, the service module 110 is in a location that is remote to that of the one or more user modules 105. In any event, while every user module 105 has access to the service module 110 for purposes of accessing and searching the information sources, only a select group of users will have access to the service module 110 for the purposes of adding information sources, changing the contextual index 330 by way of adding, removing, or changing criteria located thereon, or changing the graphical settings for the display of information sources via the respective graphical user interfaces 205 of each user module 105.

Data Structure

As presented above, the data storage component 325 provides for the storing of data related to plural sources of information, in one example pertaining to a same subject area, in one or more data structures. These data structures illustratively comprise one or more data tables which, in turn, contain the interrelated sources of information.

In one example, a data structure is established using a vertical architecture, wherein at least some of the tables defined therein are vertically associated thereby improving efficiency in searching through this data structure while further facilitating amendment thereof for the addition, editing and/or removal of data.

Figure 4A:
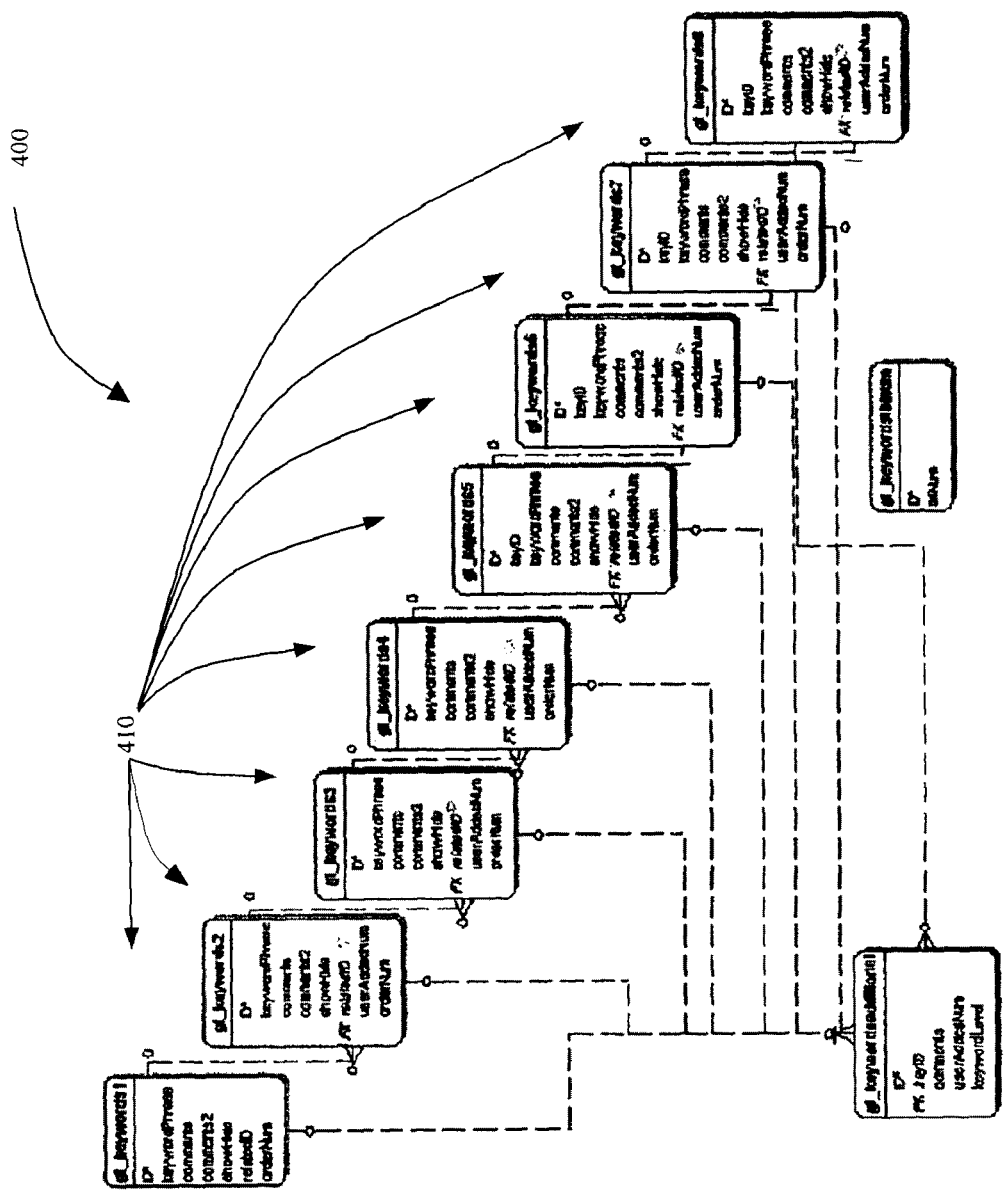
FIG. 4A depicts a vertical arrangement of data structures used for storing and linking interrelated information, in accordance with an embodiment of the present invention.

FIG. 4A provides an example of how a vertical architecture may be implemented for keyword and/or phrase searching through the sources of information, and optionally, to various locations therein. The keyword structure 400 of FIG. 4 generally provides for improved speed of database queries and establishes programming relationships for content as it is added. As the number of user modules 105 that communicate with a given service module 110 increases, the need for improved efficiency in this respect also increases. As shown, the table structure 400 exists in a vertical arrangement rather than a conventionally horizontal one. This structure 400 thereby reduces the total number of tables from hundreds to only a few while enabling table indexing to improve speed of the database queries and to help relationships between sources of information to be represented within the table structure 400 in a manner independent of the number of information sources or the sizes thereof.

In one embodiment, the table indexing is accomplished by using mapped fields in a vertical table structure, for example as discussed with reference to the example of FIG. 4. The vertical approach with mapped fields allows the storage of many different combinations of issues and information sources in fewer database tables than the relational database architecture of known systems. The vertical table structure with mapped fields allows for rapid development by having a simple, flexible and efficient database structure with few tables. This, in turn, allows for easy maintenance of a complex mutable system, i.e fewer database indexes and joins; code re-usability as different structures of data (e.g. different information source categories or types) are able to share or re-use a same query language; and a simple database model outlining and interlinking systems and logic to different components and parts of the data structure.

Figure 4B:
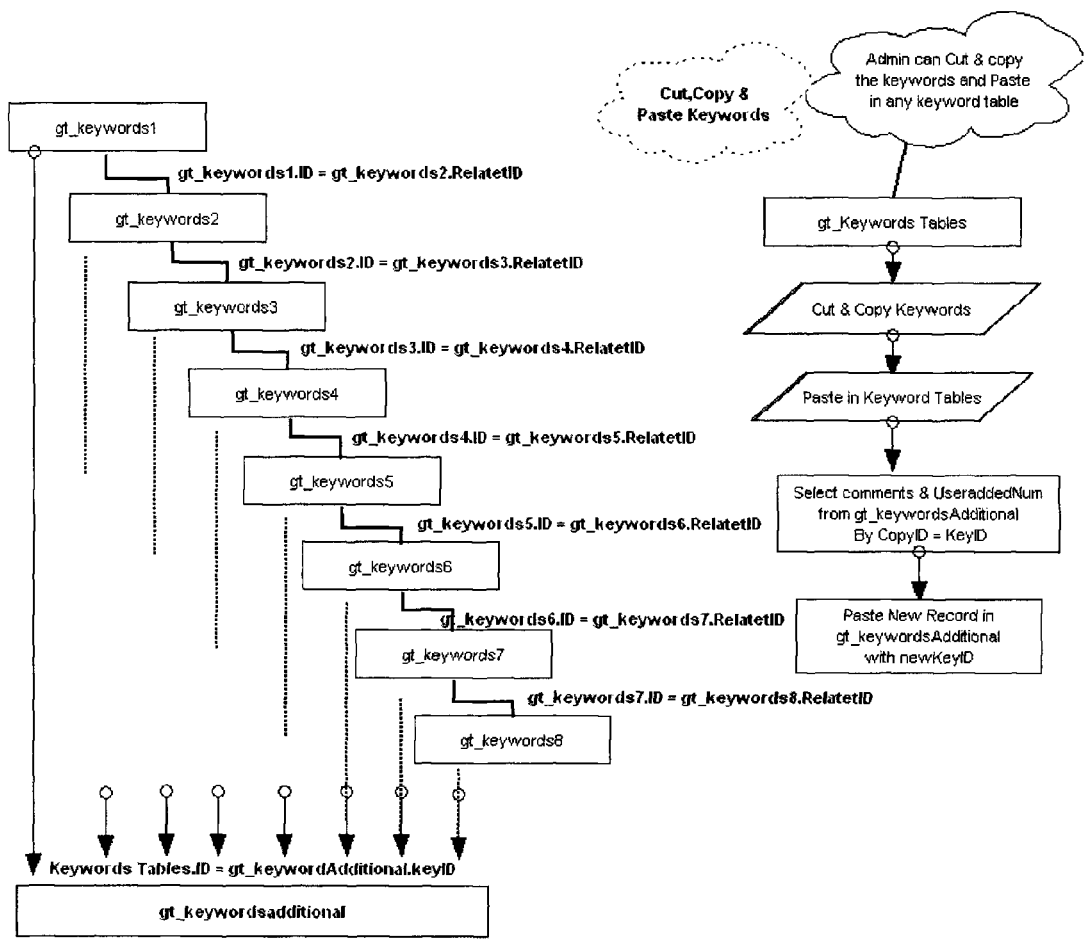
FIGS. 4B and 4C are entity relational diagrams respectively depicting a vertical arrangement of stored keywords and phrases, and stored findings, for providing access to interrelated sources of information, in accordance with an embodiment of the present invention.
Figure 4C:
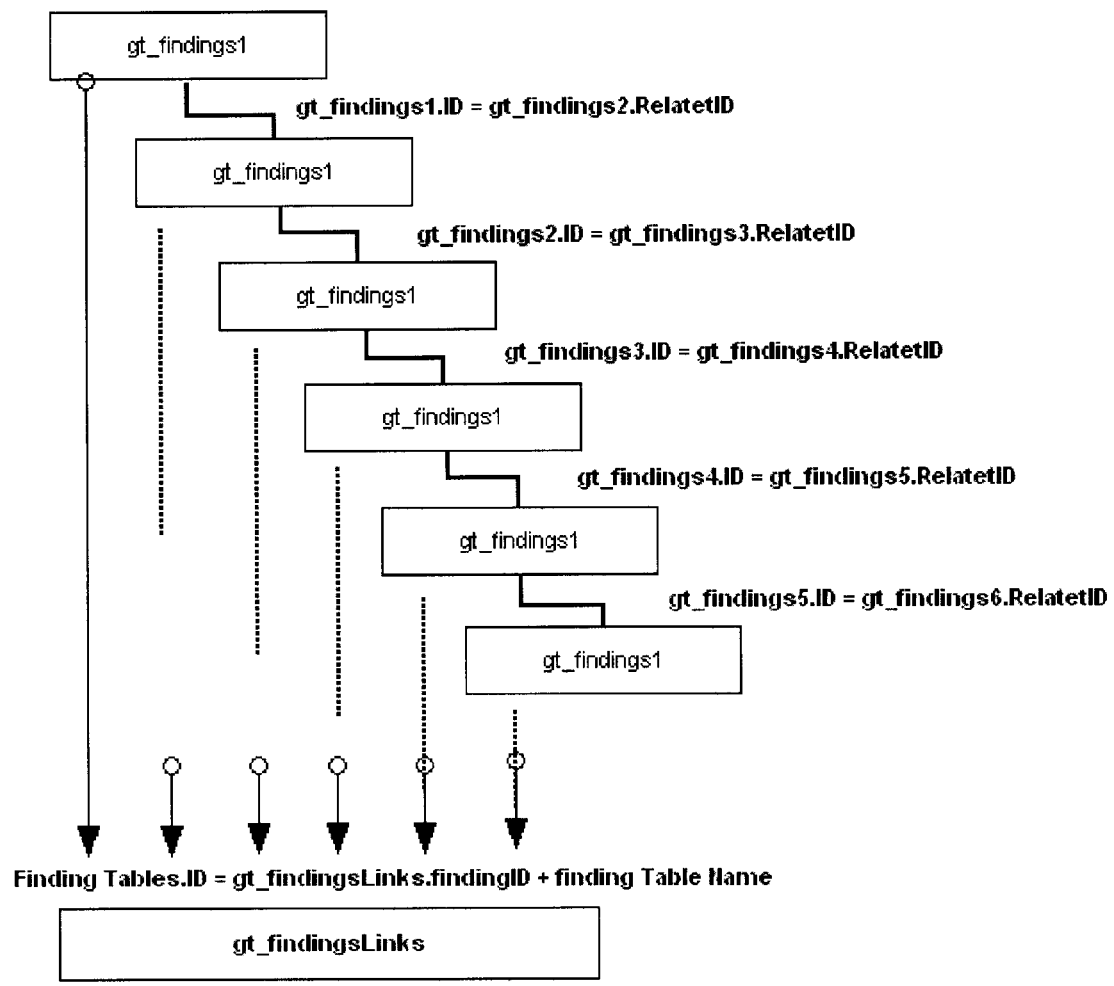

FIGS. 4B and 4C provide example entity relational diagrams identifying the relationships and associations between different entities of a data structure, in accordance with one embodiment of the present invention. In particular, the examples of FIGS. 4B and 4C are provided for a system designed to provide a user module access to various information sources related to a same legal area, and depict a vertical data structure for storing and managing keywords & phrases, and findings & authorities considered, respectively. As illustrated by these figures, as new data is entered, it is associated with pre-existing data in a vertical fashion thereby facilitating amendment of the data contents without unnecessarily increasing the number of interrelations and data combinations, which ultimately increases the data structure efficiency in returning queried or searched data.

It will be understood that similar architectures can be implemented for other components or sub-components of the data structure without departing from the general scope and nature of the present disclosure. For example, vertical associations may be used for all of the data categories and types stored in the data storage component, or again, may be combined with traditional horizontal associations thereby providing a hybrid data storage architecture.

Statements and Instructions

As presented above with reference to FIG. 3, the computer readable media 305 of the service module 110 further comprises, in accordance with one embodiment of the present invention, a set of statements and/or instructions 310 that, when executed by the processor 315, for example in accordance with inputs received from the user module 105, provides the user module 105 access to selected and/or requested information. The set of statements and instructions 310 may also provide means of searching, accessing, and locating information sources from the data storage component 325, for example via the contextual index 330. The set of statements and instructions 310 can be configured, for example, to prepare the data for communication to the user module 105 over communication medium 115. Once received by the user module 105, the transmitted data may be displayed to the user via graphical user interface 205, namely displaying the requested information sources, topics, and/or means for searching and/or navigating those sources and topics.

In one embodiment, the portion of the set of instructions and statements 310 that interacts with the data storage component 325 through the processor 315 may use SQL, which is a standard language for relational databases. Other languages available for implementing the services of the present system may also be considered in the present context without departing from the general scope and nature of the present disclosure, as should be apparent to the person skilled in the art.

In one embodiment, a database conforming to a relational model that uses SQL is implemented in a vertical relationship. Such an implementation provides for the expression of content by not only natural language but also in a form that can be understood and interpreted using XML and ASP architectures as a descriptive means to access the SQL database and support layout/rendering cues from the set of instructions and statements. As the system can support XML and ASP architectures, it provides for the capability for user modules 110 to be device-independent. Furthermore, because relevance and context can be related to the data contained in the data storage component 325, the contextual index 330 in conjunction with the set of instructions and statements 310 allow for computer inference obtaining more meaningful and accurately displayed, contextually relevant results for the user.

In other embodiments, the system can be extended to other types of languages and programming implementations interacting with the database including, but not limited to, more nested client-side applications. This would include, but is not limited to, plug-in format languages (for example, Flash, Java Applets, C#, Perl, etc.), or use of additional programming languages (ie. .Net, Ruby, AJAX, etc.). In other embodiments, the system can be enabled to allow requests to the server and database through the use of XML, JavaScript, or other platform non-specific language, which are then displayed via dynamic HTML (DHTML), thus alleviating the need for third party plug-ins. Accordingly, the system may be embodied using various platform specific and platform non-specific languages, that may or may not use third-party plug-in applications, languages, or routines.

In addition to providing for the searching, locating, and relating of the information sources and topics contained in the data storage component 325, the set of instructions and statements 310, in accordance with one embodiment of the present invention, may provide multiple services for obtaining, searching, and navigating a plurality of information sources. For example, the graphical user interface 205 of a user module 105 may provide for the display of various services for searching, viewing, and navigating between the plurality of information sources, wherein these services are provided and implemented by the processor 315 of the service module 110 in response to user inputs received from the user module 105.

One such service may include, for example, listings sorted by the topic or title of the plurality of information sources, wherein each topic or title of an information source is listed alphabetically and linked to related topics or titles of information sources. Selection, by the user via the user module 105 and communicated to the service module 110, causes expansion of the topics or titles to include related topics or titles. The inclusion of the related topics and titles within a branch of the service is determined, in one embodiment, by reference to the contextual index 330, described in greater detail below.

Another of these services may provide direct access to related sources of information from a given source of information, wherein sections within each source can be annotated to be linked to one or more other related sources of information or locations therein. The annotation may include information pertaining to the related source of information providing for quick assessment as to whether the related source of information is valuable in a given context before accessing it. The annotation may also include data that relates the currently selected information source to one or more other related topics or issues. Selection of these topics or issues results in a branched listing of all topics or issues of information sources that relate to that topic or issue. The ability for direct access to the related topics or information sources is provided for, again in accordance with one embodiment of the present invention, by the contextual index 330 as the information contained therein provides the information outlining the relationships.

Another of these services may provide for text searching of both the index of titles and topics, or other types of relationships, as well as the sources of information themselves. As will be apparent to the person skilled in the art, other types of services may be considered herein without departing from the general scope and nature of the present disclosure.

Contextual Index

As presented above with reference to FIG. 3, the computer readable media 305 of the service module 110 further comprises, in accordance with one embodiment of the present invention, a contextual index 330. The contextual index 330 allows for the association of disparate sources of information wherein there are many different relationships and many different types of relationships that relate various topics or sources of information related to a given subject. The contextual index 330 allows for complex interrelated indexing of data to occur with minimal user intervention.

In one embodiment, the contextual index 330 uses a nested set model approach, which allows for fast database index searches and data partitioning that allows for easy and fast extraction of parts of the stored data through using key indexes. Using this contextual index, data can be stored and grouped with different sets of data in a single nested table that can accommodate new data structures as the system grows. The nested set model allows for entire sets of relationships, which may relate to a particular criteria or category of relationships, to be expressed in fewer tables than would be required using previously known systems. The single nested table provides for the storage of criteria that define relationships between information sources or topics. Keywords, references, sources or other data types can all, through the single nested table, be linked to destination codes placed within information sources thereby allowing for easy navigation between interrelated information sources, or viewing related topics and information sources that may be related to those topics.

In one embodiment, the contextual index 330 allows for the indexing and storage of several hundred document types with hundreds of data types in a web environment using ASP and XML to communicate with a MS-SQL database. The ability to script a means of communication with a data structure enables quick data-entry using a secure web-browser. Accordingly, a system administrator may add content with complex interrelations quickly via a communication medium 115, such as for example the internet or an intranet, thereby providing a real-time user experience with current indexed data. Using this type of construction, the information sources can be accessed and searched quickly and conveniently through an environment by a user module 105 located anywhere provided it has a communication means 230 with access to the communication medium 115, which can in turn be accessed by the service module 110. Furthermore, the building of a system relating to a given subject area can be undertaken.

As described above, in addition to the storage of the sources of information, data that defines the nature of the relationships between the sources of information is also stored, thereby facilitating the accessing and searching of the interrelated information sources. In one embodiment, the system provides for the ability to index the tables contained in the data structures in such a manner as to provide the ability to locate information related to the location of data or other sources of information that is quicker and more efficient than known methods. It also enables the introduction of information sources, and the linkage of those sources by way of an existing or new relationship to new or existing topics or other information sources, with minimal user input.

The discloses system and data structure thereof provides for very little limitation on the types of relationships between information sources that can be used for accessing the inter-related information sources, allowing for the efficient linkage of many disparate, but related, sources of information, often stored in varying formats. By storing these relationships in the form of a contextual index, as discussed above, it is easy to locate sources of information, or locations therein. Furthermore, the indexing of the relationships allows easy and efficient navigation from a source of information to another source of information which may be related in some way. Additionally, disclosed system provides users with a means to create complex interrelated indexing of data with minimal intervention, while allowing for an accurate search and retrieval of content. As a result, the data entry of the sources of information into the system and data structures is made easier, thereby requiring far less time and effort.

In general, the interrelated data sources are stored in a data storage component. Any of a number of criteria of possible relationships that would be significant to the given subject are also stored, for example, as part of a contextual index for associating the data sources based on their pre-existing inter-relations. These criteria may include for example, but are not limited to, the topic or issue to which the subject relates (of which there may be many), the title or sub-title of the information source (of which there may be many), the historical significance of the information source (of which there may be many), or direct reference (of which there may be many). Each relationship in each criteria, or group of relationships in each criteria, is linked to destination codes that refer to specific information sources, or locations therein.

Data Sources and Relationships Input and Management

In one embodiment, the invention, among other applications, assists in improving storage, indexing, retrieving, and managing data sources that are from knowledge-intensive subject areas. The system provides means for management and interrelation of discrete bits and collections of information that make up a particular subject area while applying unique features and attributes of that data, in complex inter-relations that may be too complex to be handled by automatic computer recognition.

In some embodiments, the statements and instructions stored on a computer-readable medium, when executed by a computer, enable the creation and communication of complex relationships between concepts and information by using semantic and relational concepts of meaning and associations of those meanings separated from logical programming code. It is within this abstract relational structuring and organising of data, that knowledge can be discovered, interpreted, and communicated in an economical model via an electronic portal.

Relationships that may be indexed in a given embodiment of the system, may form a "matrix" as a discrete datum can have a multitude of relationships between it and other datum. Some may be horizontal, some vertical, some diagonal, some direct, some indirect, some to other parts of the data storage medium, some to data sources included in the data storage medium housed in the service module, and some to content outside the system (e.g., other content on the internet), for example. The relationships may be formed between both data sources and relationship criteria (including but not limited to context or concepts) and may be contained in information linked to the contextual index. As the service module provides for the addition, editing and/or management of the relationships, criteria and/or locations, the index can change over time as concepts and information evolve. Consequently, the nature of the relationships, the possible combinations and the level of detail are practically endless. The system of the present disclosure may thus be configured to enable a content owner, or individual having access to such content, to organise and integrate data sources relevant to a knowledge intensive subject area of interest in a concise, efficient and dynamic manner.

In some embodiments of the present invention, the set of statements and instructions, when executed by the service module processor, provides means for a type of relationship to be created or changed and for the addition, editing, or execution of database relational functions, in a manner that can be accomplished with little or no prior knowledge of software or database systems. Accordingly, access to interrelated data sources relevant to a knowledge intensive subject area may be provided by a system administrator and/or content owner/provider possessing such knowledge, irrespective of this person's programming and data structuring skills.

The invention will now be described with reference to specific examples. It will be understood that the following examples are intended to describe embodiments of the invention and are not intended to limit the invention in any way.

EXAMPLES

Example 1

Figure 5A:
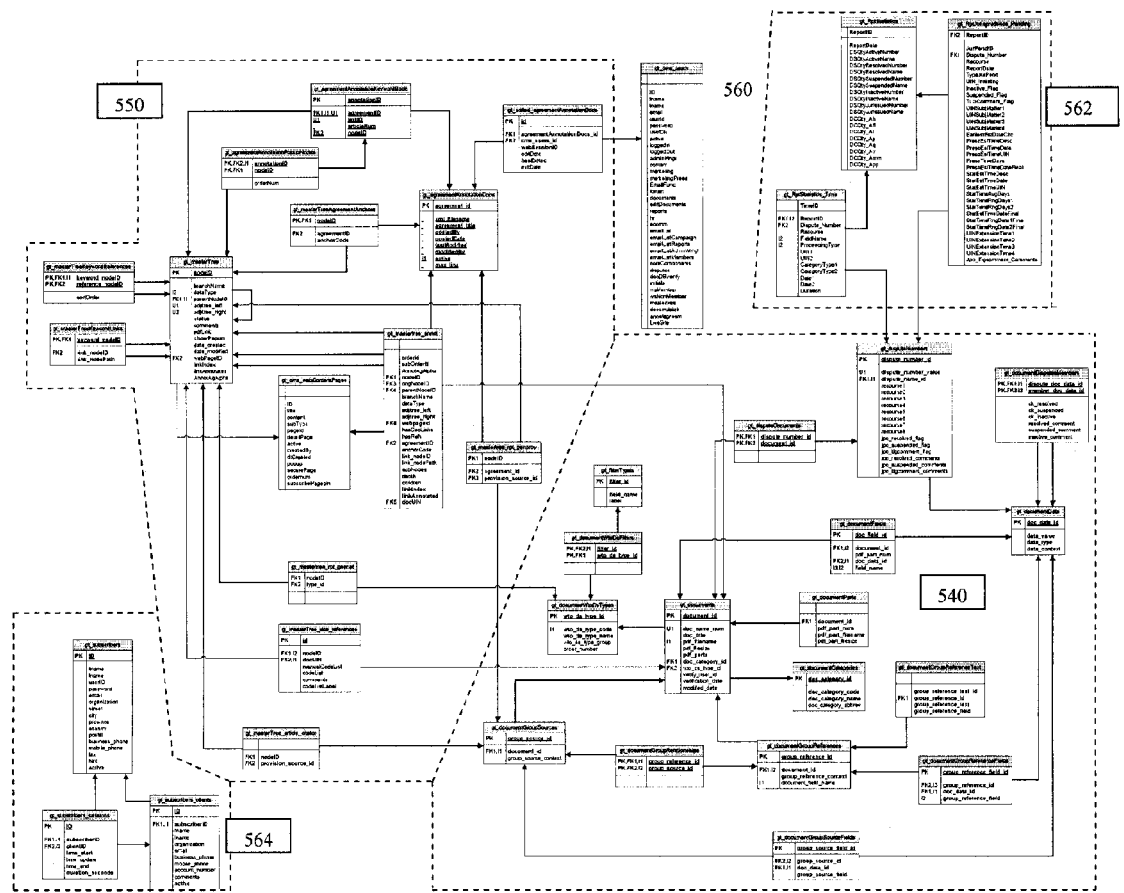
FIG. 5A is a schematic representation of a data structure stored on a computer readable medium, in accordance with one embodiment of the present invention.

FIGS. 5A to 5E provide representational schematic diagrams outlining the data structure of an embodiment of the present invention, wherein interrelated sources of information pertaining to a same area are stored and associated for access by a local or remote user module. Particularly, FIG. 5A provides a high-level representation of the system's entire data structure, which is subdivided into five main groups of tables, as shown by phantom lines. The group 540 defines the portion of the data structure that maintains the data storage component of the system, or in other words, where the information sources are stored. The group 550 defines the portion of the data structure that maintains the contextual index information, or in other words, where the information that provides for the linkage of all information sources, and locations therein, according to various relationship criteria, is stored. The table 560 contains information related to all users, including those with privileges to write or remove information from any of the data structures. The group 562 contains information related to the collection of information sources that may not yet be complete and thus subject to ongoing amendment. The group 564 contains information related to the subscriber use of the system so as to keep track of the level of use. It will be understood that other groups and/or sub-groups may be defined in a given embodiment without departing from the general scope and nature of the present disclosure, and that such those depicted herein are meant as illustrative examples of a specific embodiment only.

Figure 5B:
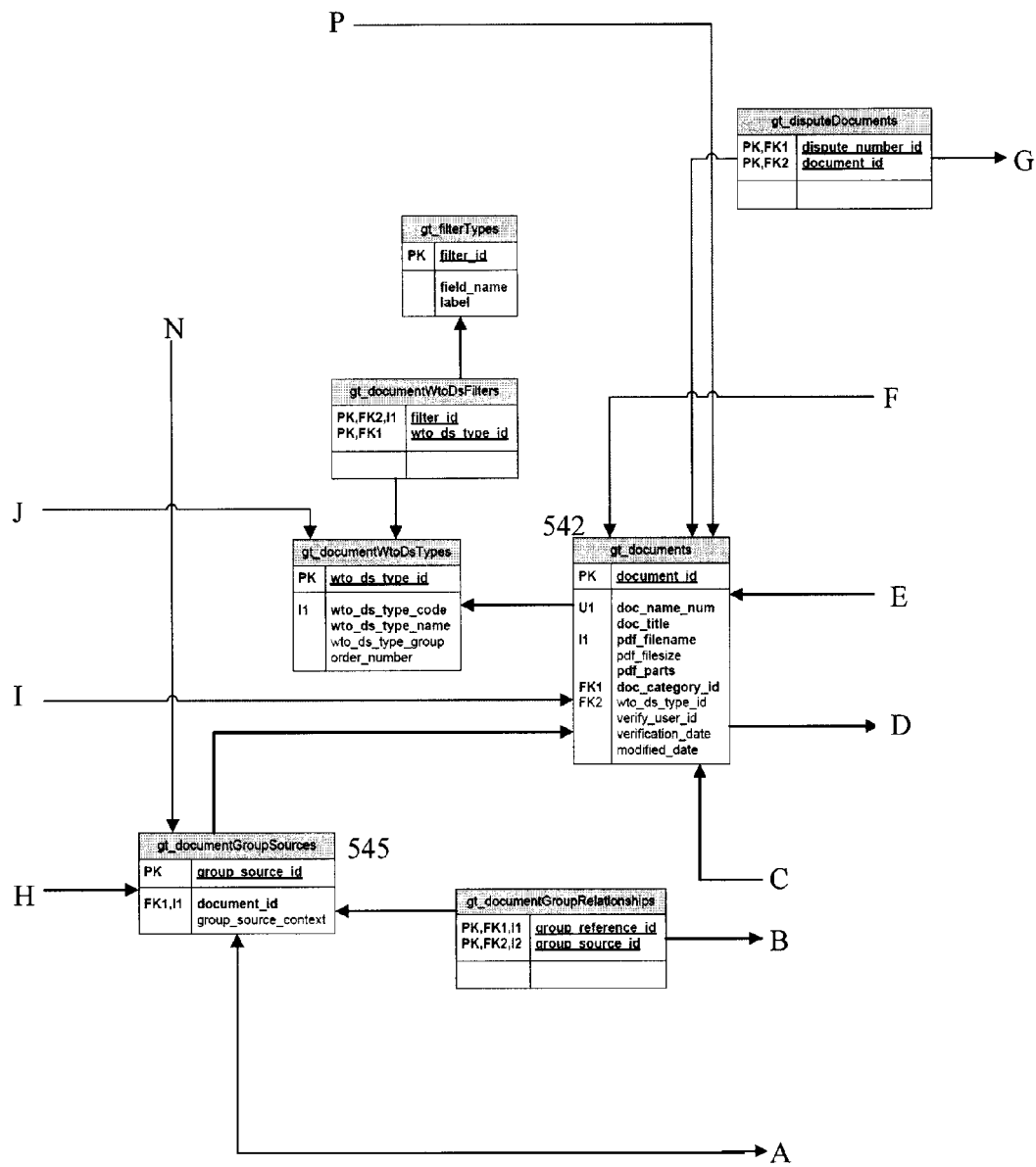
FIGS. 5B and 5C are portions of the data structure of FIG. 5A showing in greater detail a data storage component thereof.
Figure 5C:
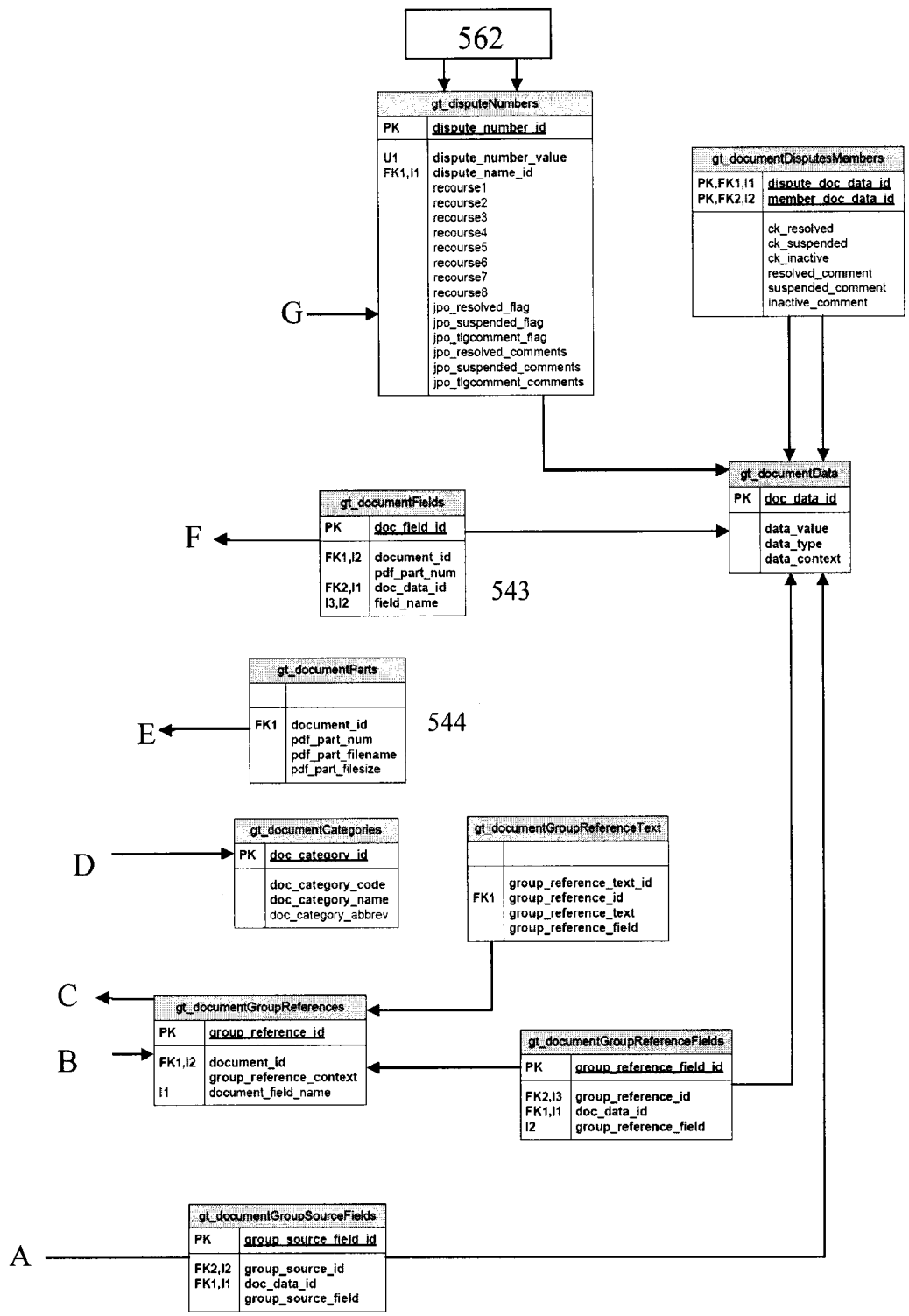
Figure 5D:
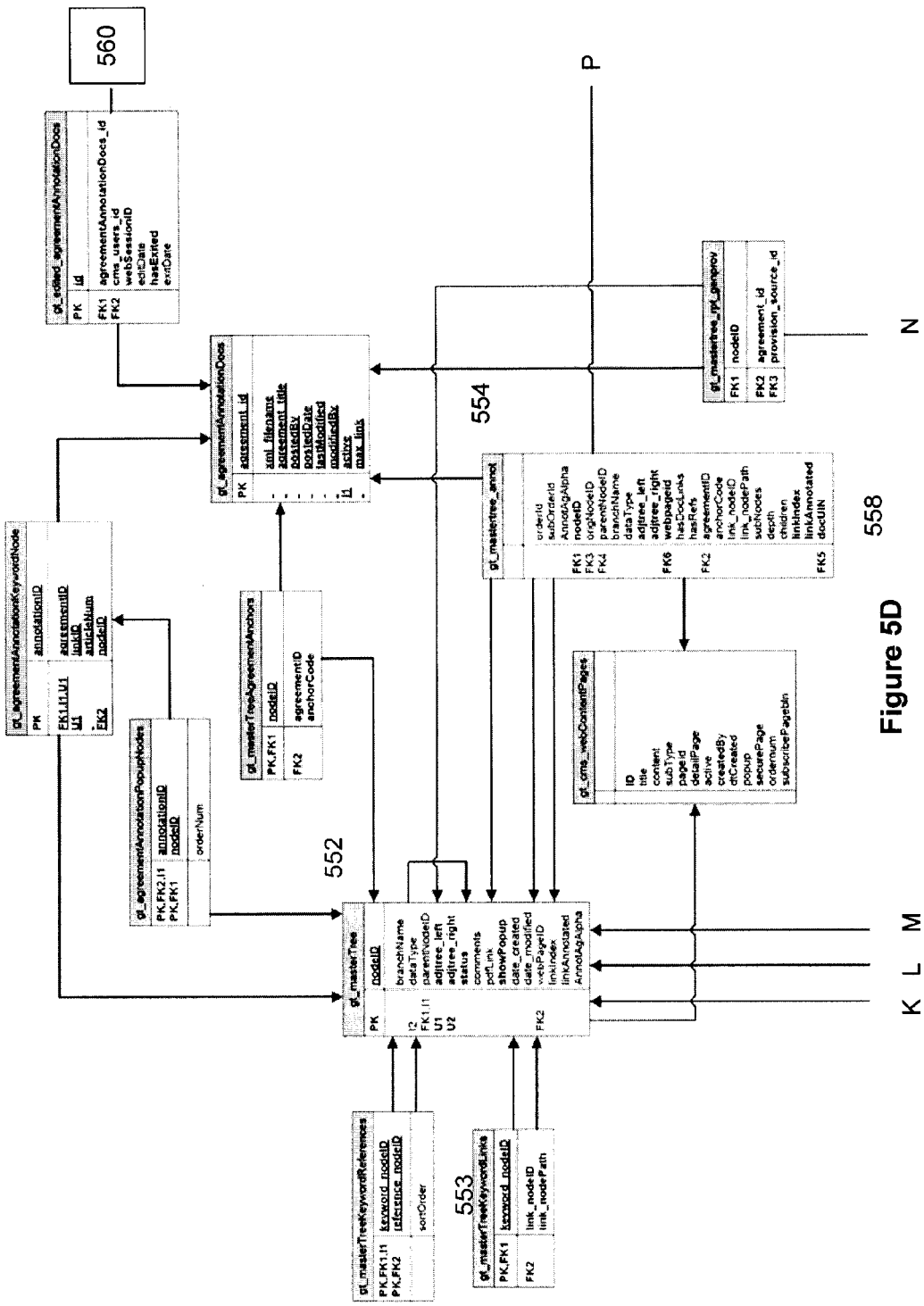
FIGS. 5D and 5E are portions of the data structure of FIG. 5A showing in greater detail a contextual indexing component thereof.
Figure 5E:
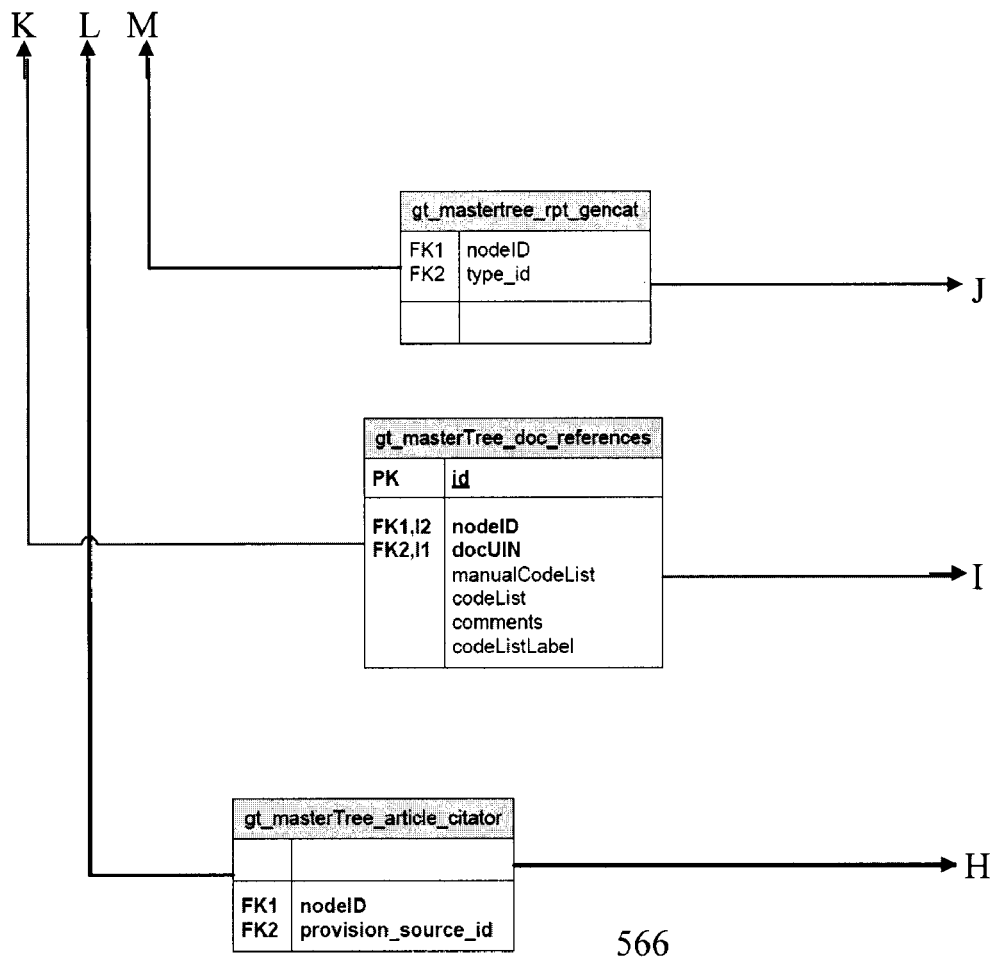
Figure 6:
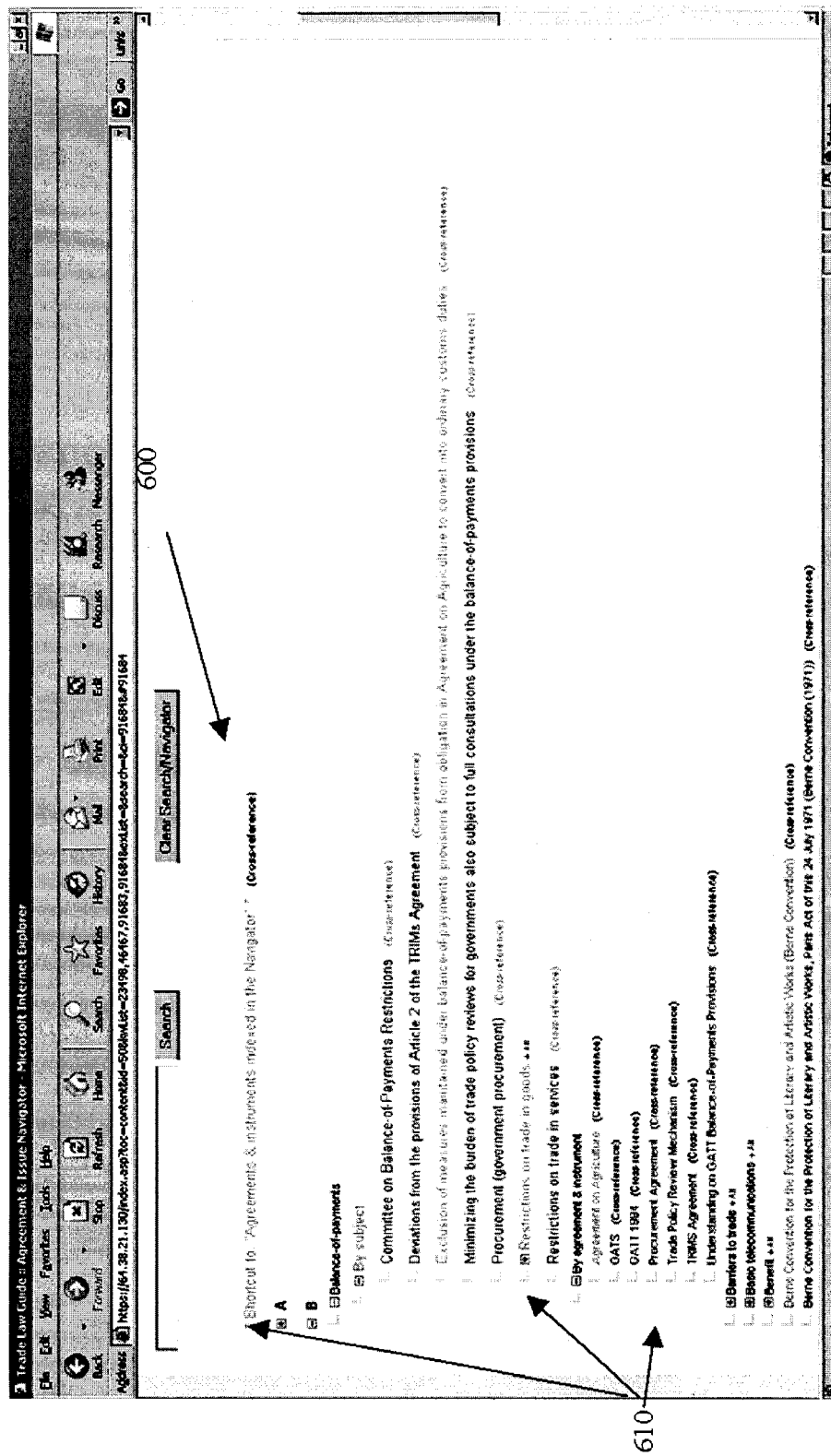
FIGS. 6 to 19 are example screen shots of a graphical user interface provided for the access of data via the user module of FIG. 1.
Figure 7:
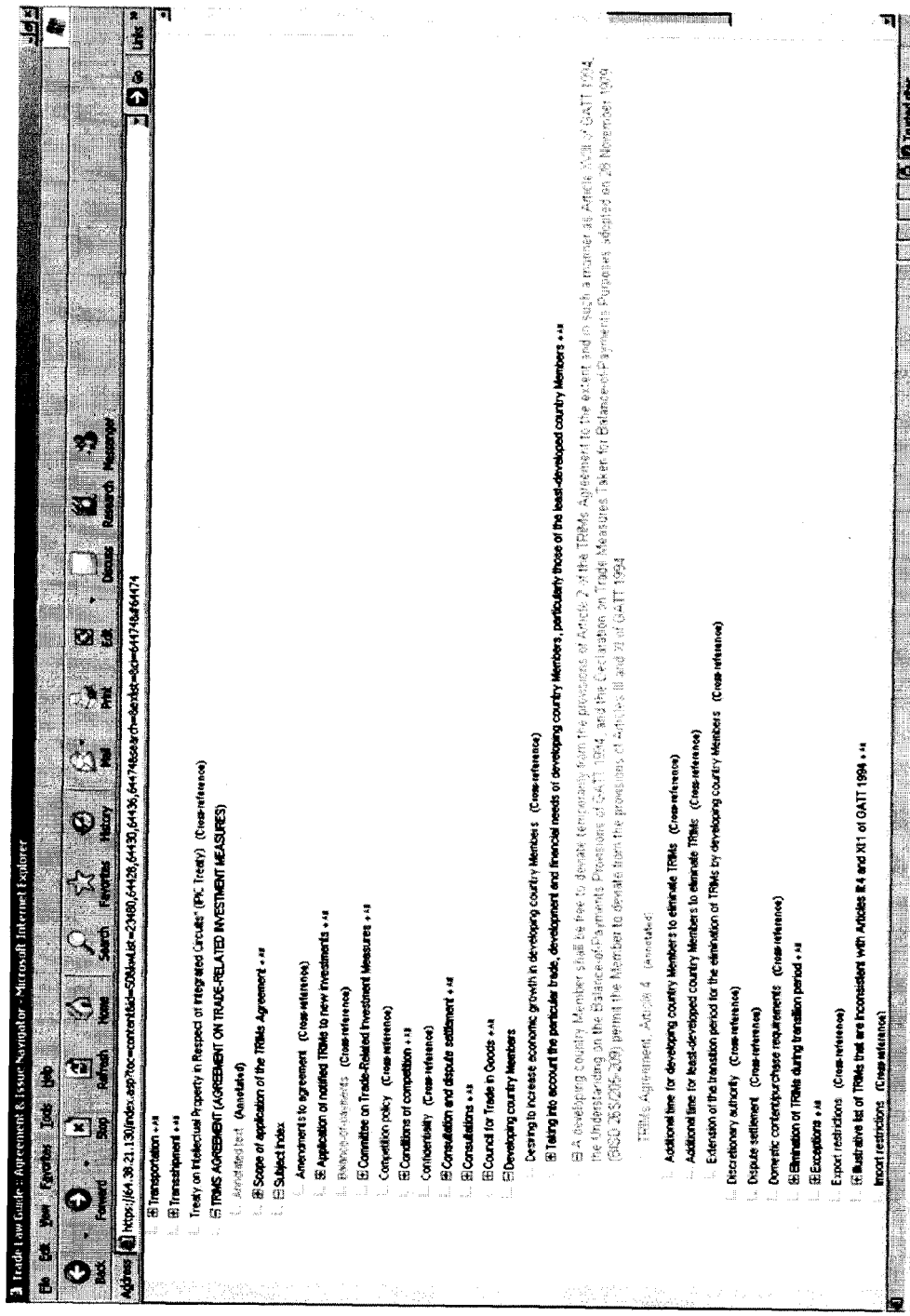
Figure 8:
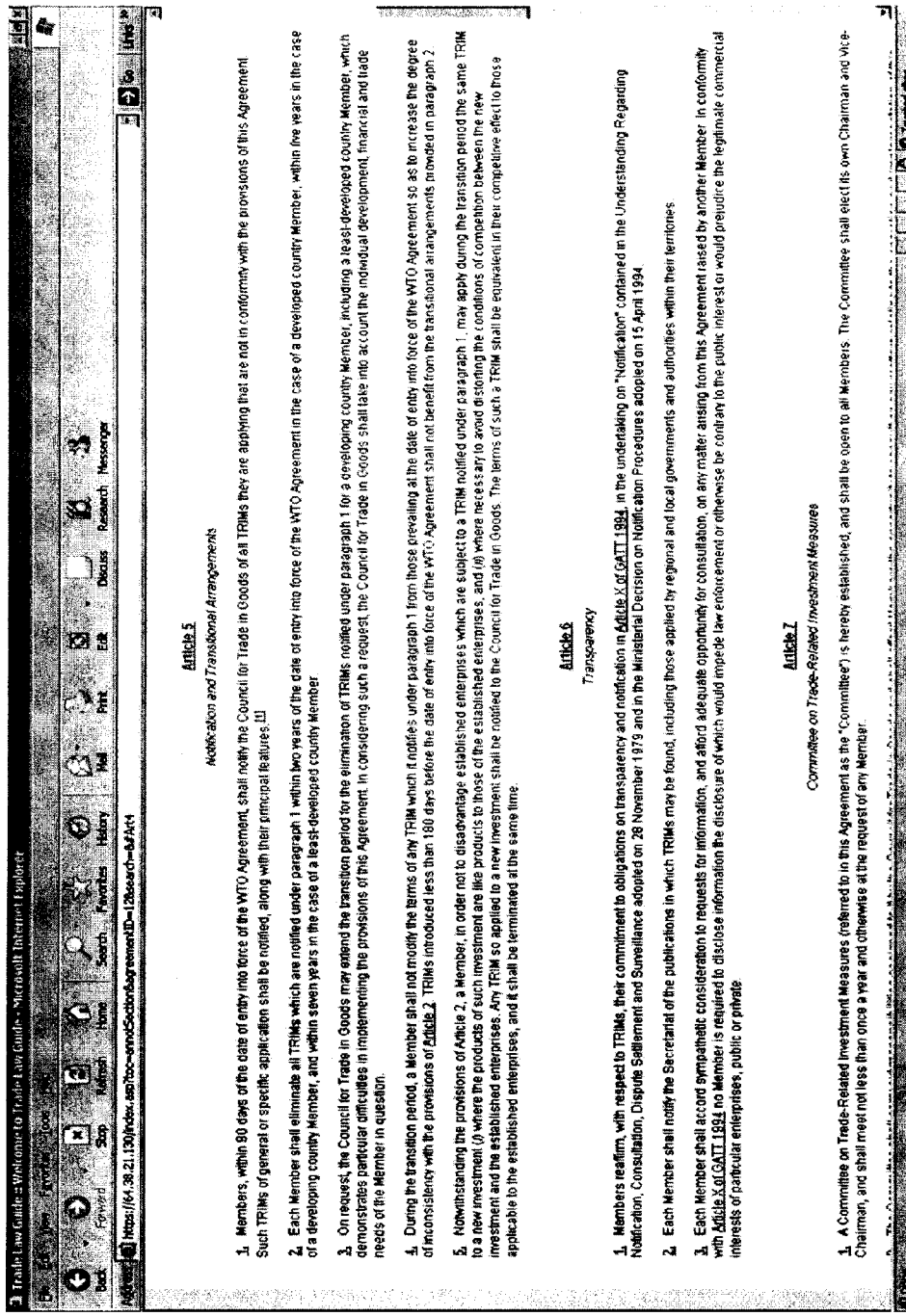
Figure 9:
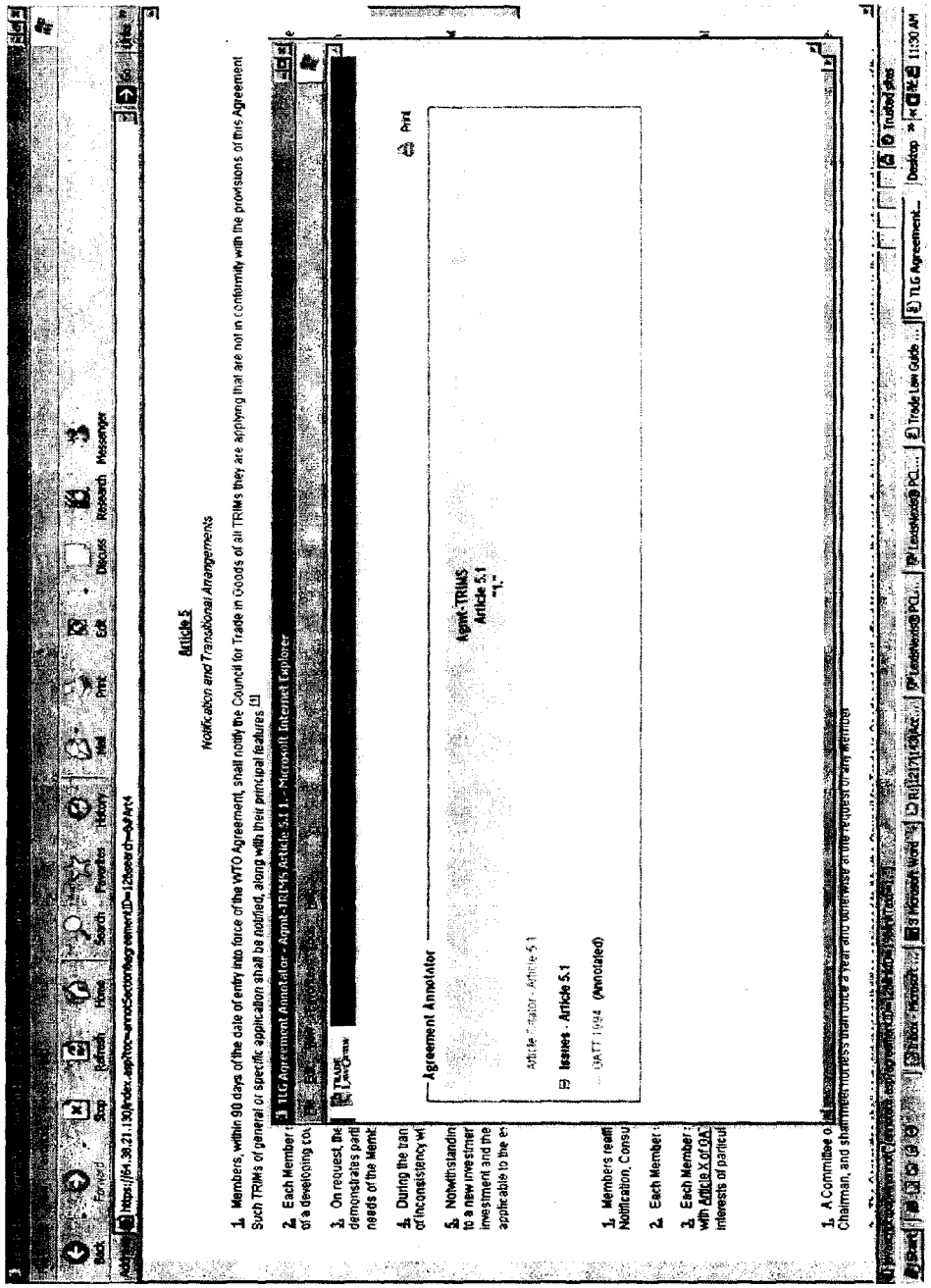
Figure 10:
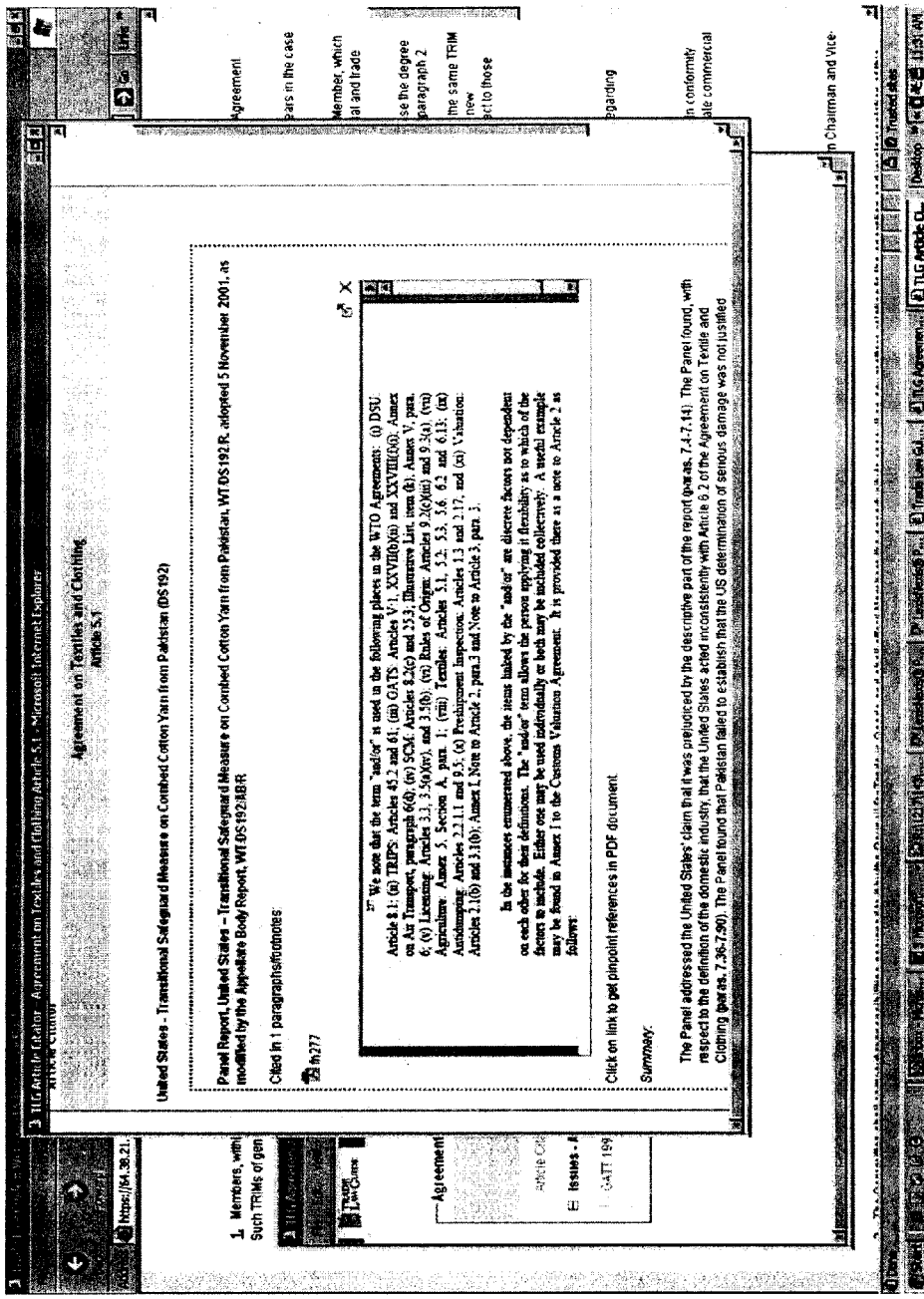
Figure 11:
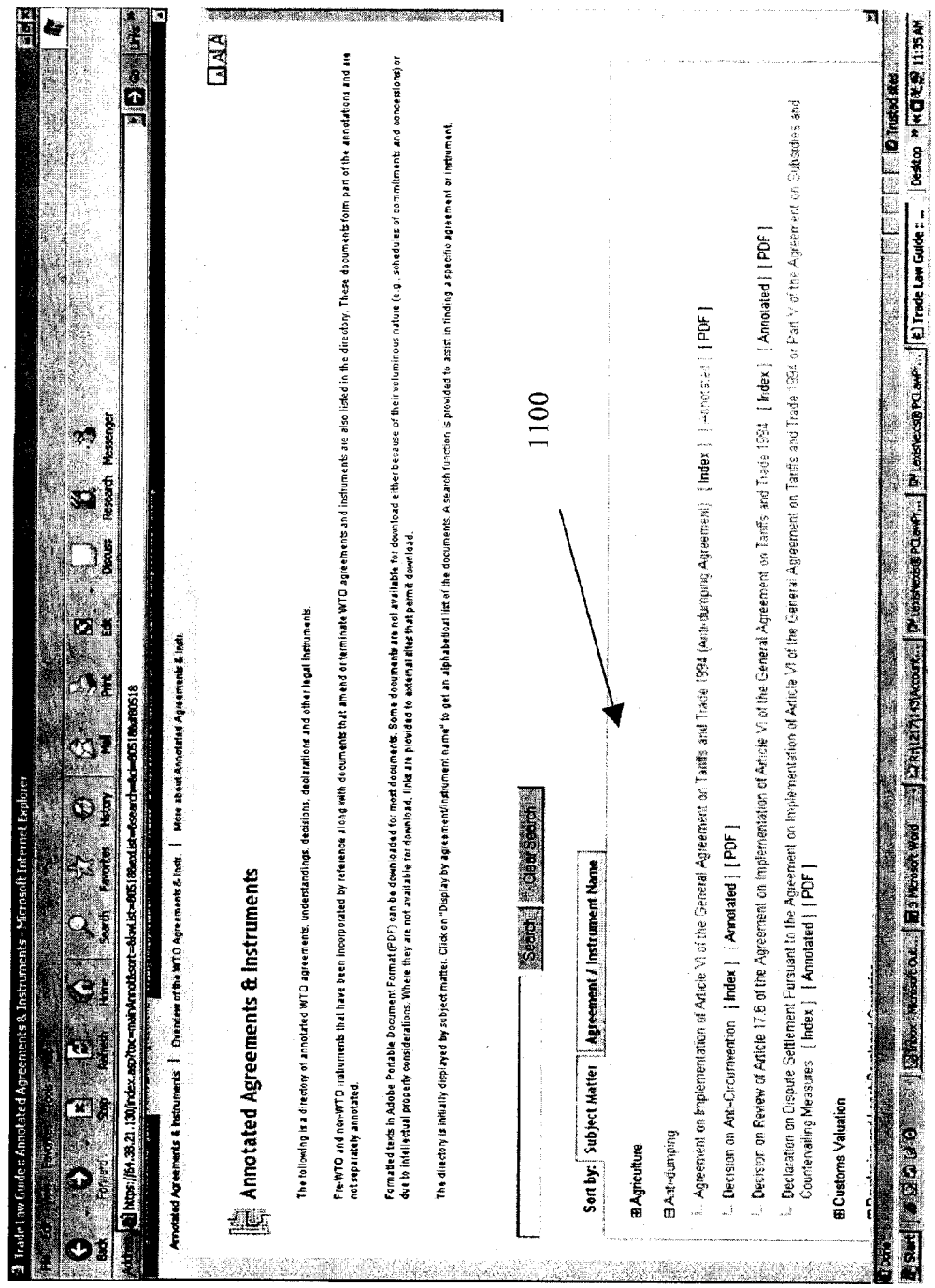
Figure 12:
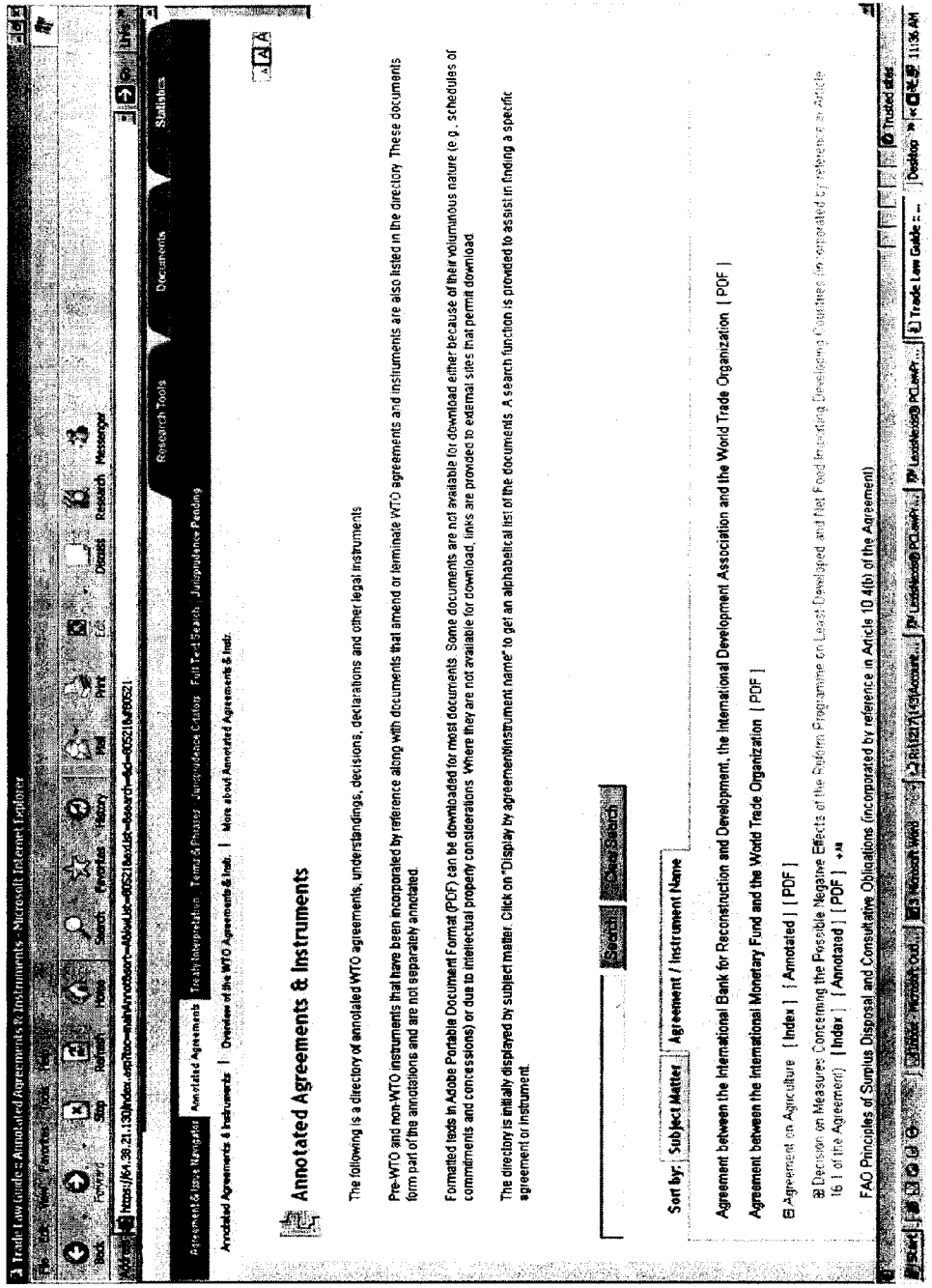
Figure 13:
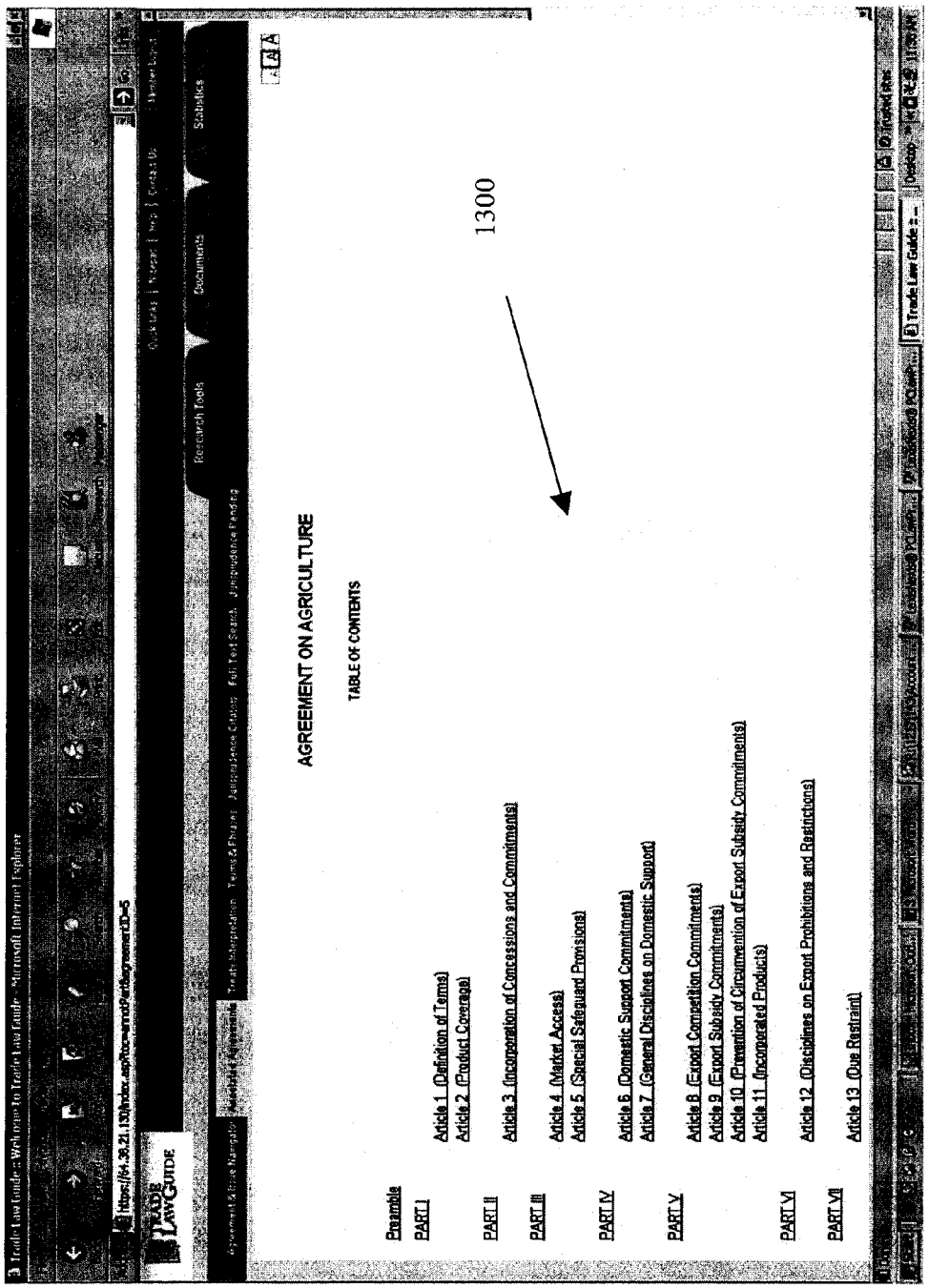
Figure 14:
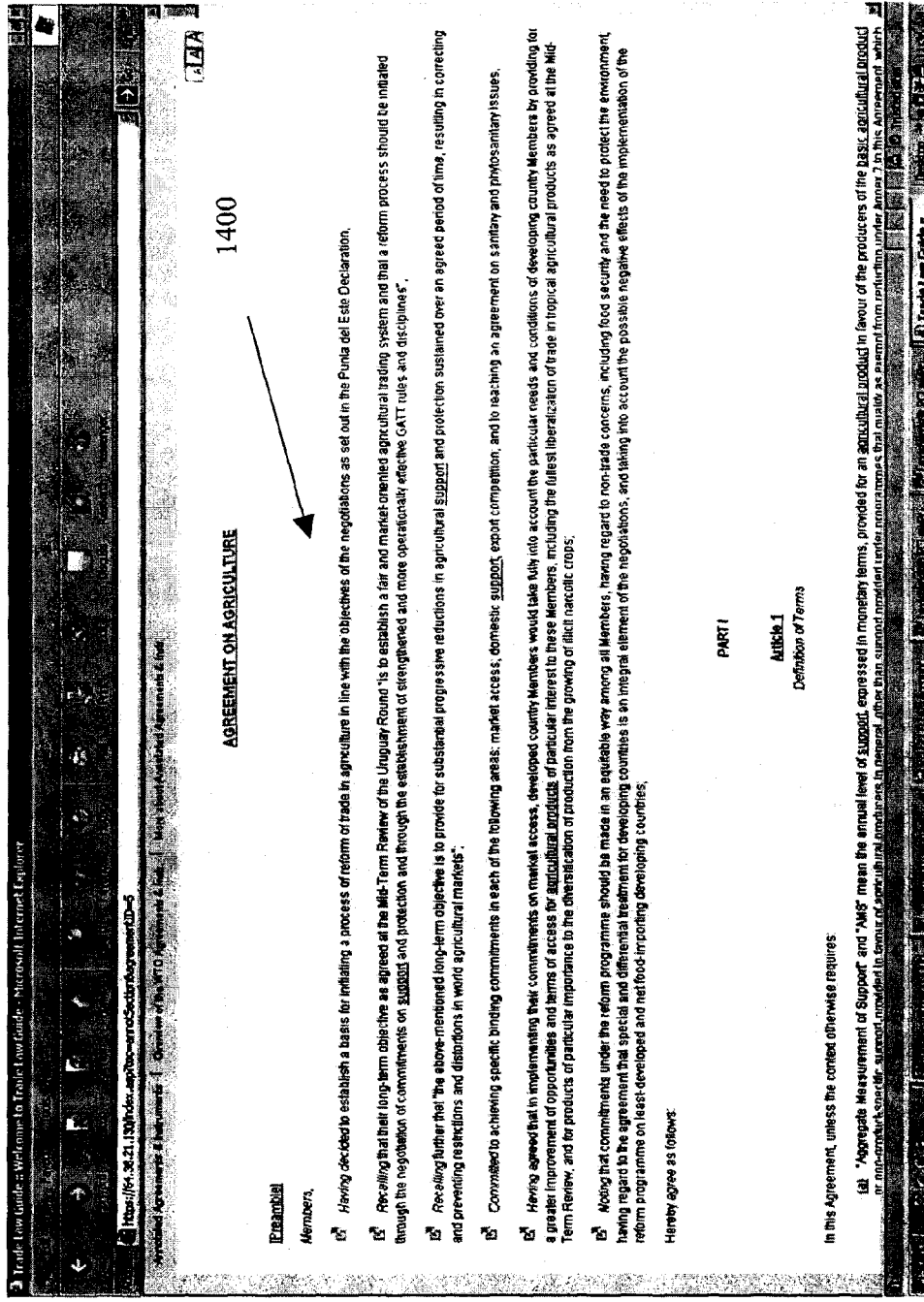
Figure 15:
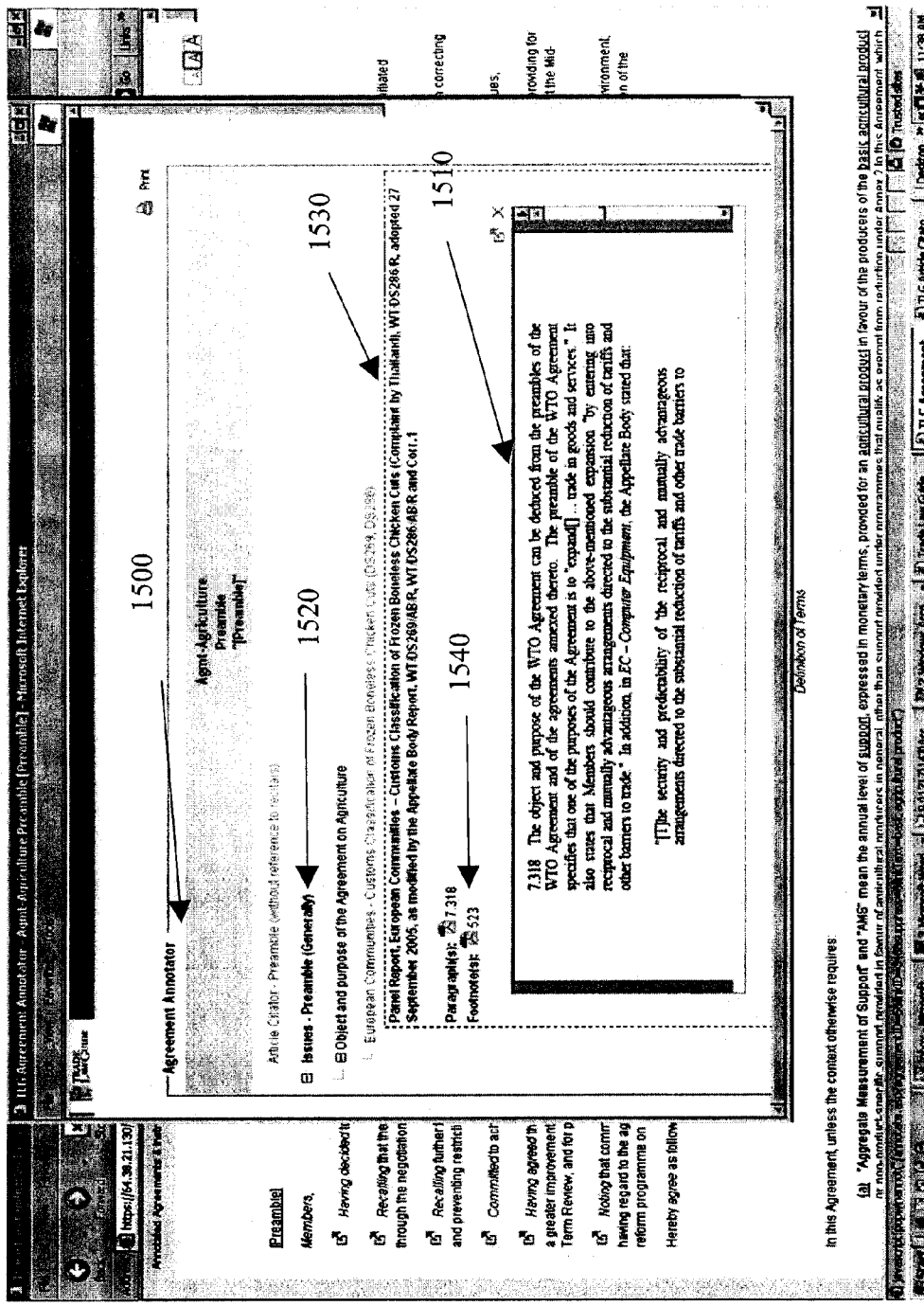

FIGS. 5B and 5C show in greater detail the data structure of the data storage component 540 of FIG. 5, whereas FIGS. 5D and 5E show in greater detail the data structure of to the contextual index 550 provided for interrelating the various sources of information stored in the data storage component 540 and providing access thereto via a user module in communication with the system. While the data storage component 540 in this embodiment relates to information sources in a particular field, this component can be designed to be used for information sources from any knowledge area. For instance, the data structure forming the contextual index 550 is generally designed to provide a means of interrelating any types of information sources which may be stored in the data storage component 540. As such the contextual index portion 550 of the data structure is designed to be used with interchangeable data storage components 540 structured to conform with data from different areas of knowledge than those specifically represented in FIGS. 5A to 5E.

The data structures corresponding to data storage component 540 shown in FIGS. 5B and 5C is a diagrammatic representation of the actual physical layout of how the information sources are stored and organised. While there are tables for certain document types used only in this embodiment (for example, dispute documents), the main table that provides data related to the identity and location of information sources is, in this embodiment, entitled "gt-documents" 542. This main "documents" table 542 contains all information necessary to locate any information source in the data storage component. It is related to supplementary data tables that provide for identification of data fields, parts, categories, reference text, references, and sources located within each information source. Accordingly, access to this table can provide the necessary information to locate not only entire information sources, but also important locations within any of the information sources. In combination with the relationships stored in the contextual index portion of the data structures, any information source, or location therein, can be referenced to any other information source or location therein.

FIGS. 5B and 5C show how the main "documents" table 542 is linked to tables that relate to specific locations in information sources. The data entry entitled "document_id" in the main documents table is listed as a foreign key in related tables thereby providing a link to sets of data that provide for locations, fields, and sources within or related to each information source included in the data storage component.

The data structures corresponding to contextual index 550 shown in FIGS. 5D and 5E provide a diagrammatic representation of how the data defining the relationships between interrelated information sources are stored and organised. The main index table of this component, which in this embodiment is entitled "masterTree" 552, details the relationships which link the interrelated information sources in the data storage component 540. Along with supplementary tables that detail relationship information, this component provides for linkage of any information sources stored in the data storage component.

The main index table 552 in conjunction with the annotation index table 554, the keyword index tables 553, and the reference and citator index table group 566 provide the main functionality of the contextual index component. The main index table 552 lists the main branches, which consist of criteria of relationships, and links to keyword data 553, annotation data 554, and reference/citation data 566, by using the nodeID data entry. As any number of criteria can be added to the main table index 552, any number of relationships based on these criteria can be built in the supplementary tables. By linking the master index table to the data storage component, the interrelations of any sources of information or locations therein, which have been flagged by field and location in the data storage component data structures 540 as per above, can be used to navigate, access, search, and locate any information required to properly understand the context in which any given source of information may exist.

As will be understood by the person skilled in the art, different data structures, and representations thereof, may be considered herein to provide similar results, and therefore, such data structures are not considered to depart from the general scope and nature of the present disclosure.

Example 2

In this embodiment of the present invention, a system is provided for providing a user module access to interrelated information sources pertaining to a given area of law, such as international trade law. A user can access various services related to accessing and searching sources of information on a user module, as in module 105 of FIGS. 1 and 2. The graphical user interface (e.g. interface 201 of FIG. 2) displayed on the user module 105 displays each of these services. Each service is created depending on data and settings provided by the service module, as in module 110 of FIGS. 1 and 3, via a communication medium by the service module communication interface 320 and set of instructions 310 located thereon (e.g. see FIG. 3). The data and settings information from the service module 110 determine the manner of display of each service on the graphical user interface 205, which allows the user access and searching abilities for the sources of information stored on the service module 110.

In accordance with another aspect of the present invention, there is provided a method, memory, and system for the arrangement of data so as to facilitate the storage and access of interrelated information sources, each of which are related to the field of international trade law. The user module 105 allows access to the data structures stored on the service module 110. The data structures therein contain display information related to the graphical user interface 205, user information, annotation information related to various documents stored in the data storage component 325 located on the service device 110, information related to past and current disputes in international trade law, findings related to disputes and negotiations in international trade law, and keyword structures 400 allowing for contextual indexing of all sources of information stored on the data storage component 325. Such sources of information may include treaties, annotated treaties, disputes, cases, findings, and negotiations, among others. The contextual index 330 allows for accessing related documents easily and quickly.

Each service provides the user with a means for accessing interrelated sources of information. In this example, the services comprise one or more of (a) a branched listing of the titles of documents or other instruments and the topics to which those instruments relate; (b) a branched listing of annotated instruments sorted either by topic or by title; (c) major instrument overview; (d) a branched listing of terms and phrases referenced by instruments; (e) a sorted listing of citations related to international legal judgements; (f) a text searching tool for all sources of information contained on the database; and (g) a report of pending jurisprudence. Each service provides for the accessing and searching of sources of information, the linkage of these sources of information to related sources or topics, and/or the linkage of topics to topics. All of these functionalities are made possible by a contextual index, such as contextual index 330 of FIG. 3. The reduction in computing resources over those required by known systems is made possible by the vertical structure of the data tables provided by the system for storing the sources of information, and the method of table indexing considered in this example.

Instrument and Issue Navigator

The Instrument and Issue Navigator service, for which example screen shots are shown in FIGS. 6 through 10, contains a branched listing 600 of international agreements, among other types of instruments, and issues. This branched listing 600 contains all the issue headings as well as all the title of all instruments available in the data storage device. The user interface displays this issue/instrument branched listing 600 in alphabetical order. The user interface allows for selection of any given issue or document contained on the branched listing 600. The source for the list of issues or instruments, shown on the highest level of the branched listing 600 in alphabetical order, is a table or tables of instruments and issues located in the data storage component on the service module. If selection is made for a particular issue, this will result in further options being made available on a branch, providing more specific topics or issues captured within the initial topic, as well as any instruments that may refer to the initial topic. The contextual index provides the information of any and all related issues and instruments, associating the issue or instrument title in question to each of said related issues and instruments. Further, a branch may contain any number of sub-branches, depending on whether a particular issue or title has more specific issues related to it, as provided by the contextual index. Alternatively, selection of a topic which may relate to another topic or information which is listed elsewhere on the branched listing 600, causes the selection to be changed to other respective location. Navigation from topic to related topic or information source is made by reference to the contextual index.

At certain locations on each branch, selection of an issue or instrument on the branched listing will cause the user interface to display associations to instruments or other issues which relate to a node 610 of the branched listing 600 from which the issue or instrument was selected. Selection of an issue can result in a further sub-branch of information depending on whether the contextual index contains further associated topics. Selection of an issue can also result in a change of the current selection to another branch or sub-branch. Selection of instruments will cause the graphical user interface to display the portion of the instrument that relates to the last selected node 610 in the Instrument and Issue Navigator (e.g. see FIG. 8). Alternatively, the instrument in question is displayed in an Annotated Instrument Navigator (e.g. see FIG. 9) so that sections in each instrument can be annotated to show relationships to other topics/issues, documents, or instruments that relate to the section of the document currently displayed (e.g. via the article citator of FIG. 10). Relationships to other topics, other instruments or documents (which can be further specified to specific portions of said instruments and documents) are defined by reference to the contextual index.

Annotated Instrument Navigator

The Annotated Instrument Navigator service, which is shown by example screen shots in FIGS. 11 through 17, contains various sub-services. The primary sub-service is the Annotated Instruments and Instruments branched listing 1100 (e.g. see FIG. 11), which can be sorted by subject matter or by title, each of which is listed alphabetically. If the branched listing 1100 is sorted by subject matter, each subject matter that relates to all of the sources of information contained in the database can be selected. Any instrument that is related to the selected subject matter will become available on a sub-branch (e.g. see FIG. 12). Each instrument listed as a sub-branch from each subject matter heading, may have other instruments that form further sub-branches from the main instrument. The graphical user interface will automatically generate these sub-branches based on information processed from the contextual index. Reference to the contextual index will cause sub-branches to include any instrument that is related by historical connection. While this particular embodiment uses historical connection, other criteria can be used as determined by the system administrator. Accompanying each of the available instruments, there are options, in the form of hyperlinks, allowing the user to select between (1) a table of contents of the various sections of the instrument 1300 (e.g. see FIG. 13), (2) an annotated version of the complete document 1400 (e.g. see FIG. 14), or (3) an embedded view 1500 (e.g. see FIG. 15) of a PDF version of the instrument (which can be expanded into a separate panel for full-screen viewing).

Selecting either the table contents 1300 or the annotated version of the complete document 1400 results in the graphical user interface displaying the entire instrument. Selection of the table of contents 1300 provides an intermediary display that allows for immediate navigation to the section of interest. Each section or sub-section of the document may contain annotation for each section or sub-section. Furthermore, terms that are referenced in the contextual index that are contained in the agreements may also contain annotation. The sections, sub-sections, or referenced terms are shown in hyperlinks and can be selected by the user. Selection of any of the hyperlinks causes the graphical user interface to display an Instrument Annotator 1500 in a separate panel related to the section/sub-section/referenced term.

The Instrument Annotator 1500 panel displays (a) all directly cited instruments, (b) all other related issues, and (c) all historically connected instruments, which are related to the instrument section or sub-section, or referenced term. By reference to the contextual index, related instruments and issued are displayed in the Instrument Annotator 1500, allowing the user quick and efficient access.

Figure 16:
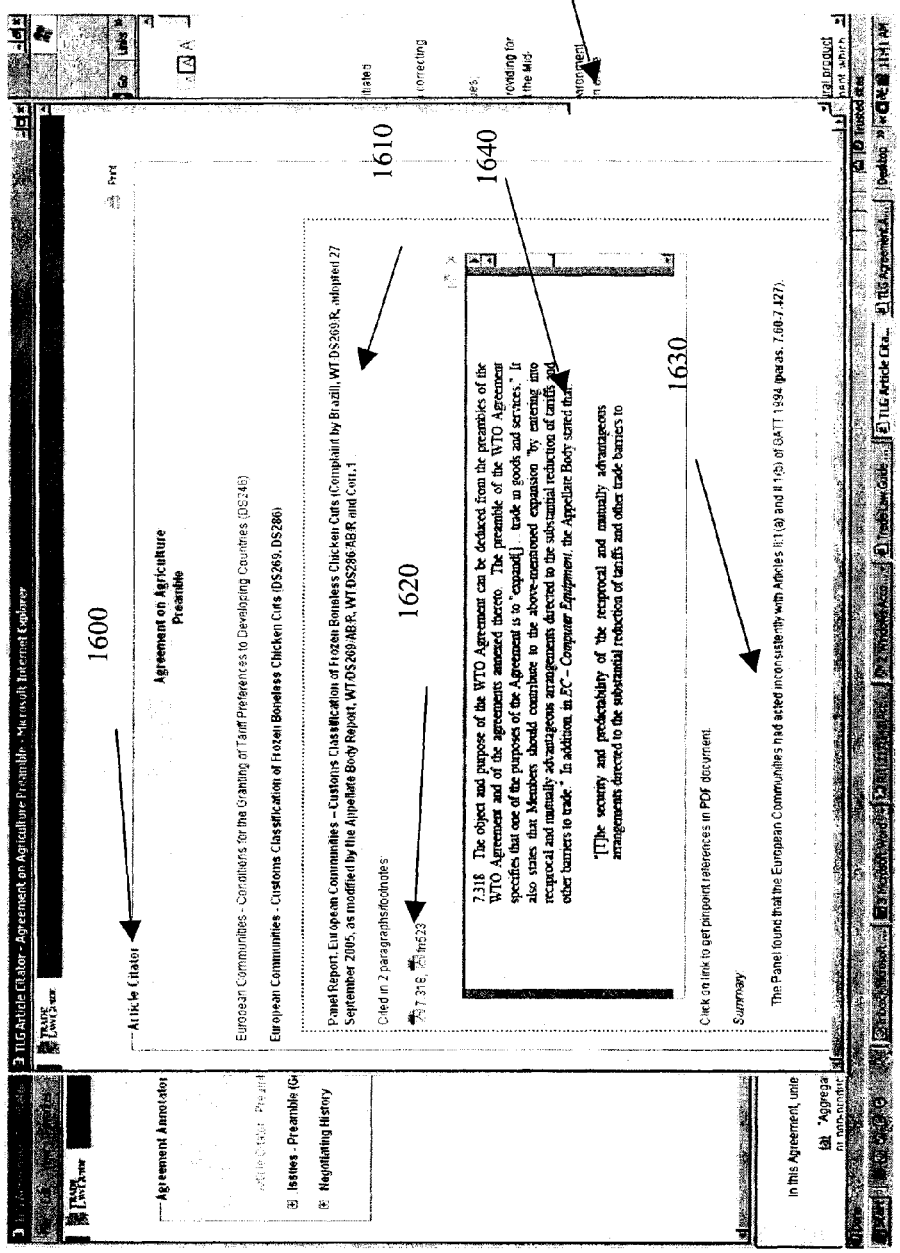
Figure 17:
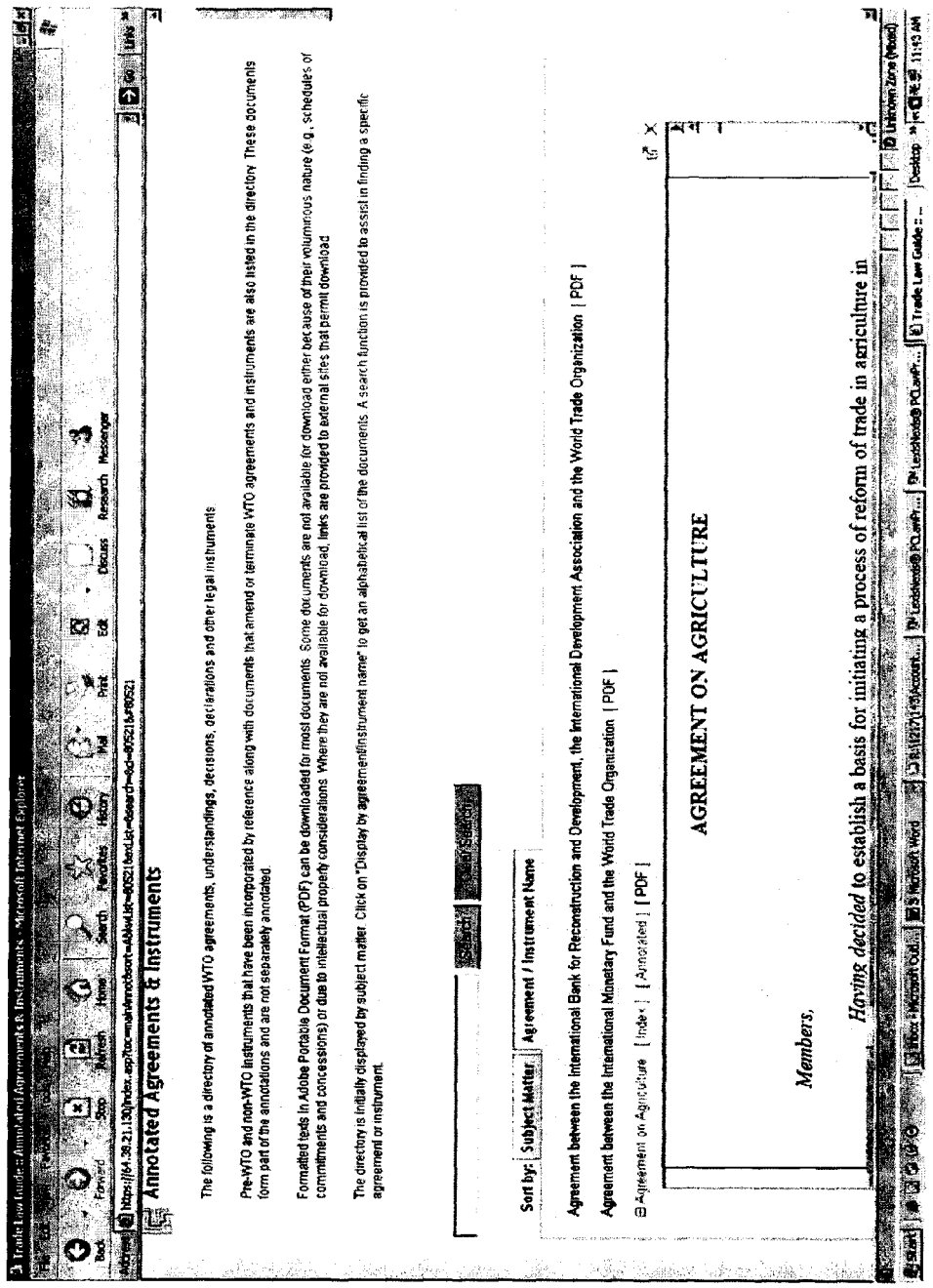
Figure 18:
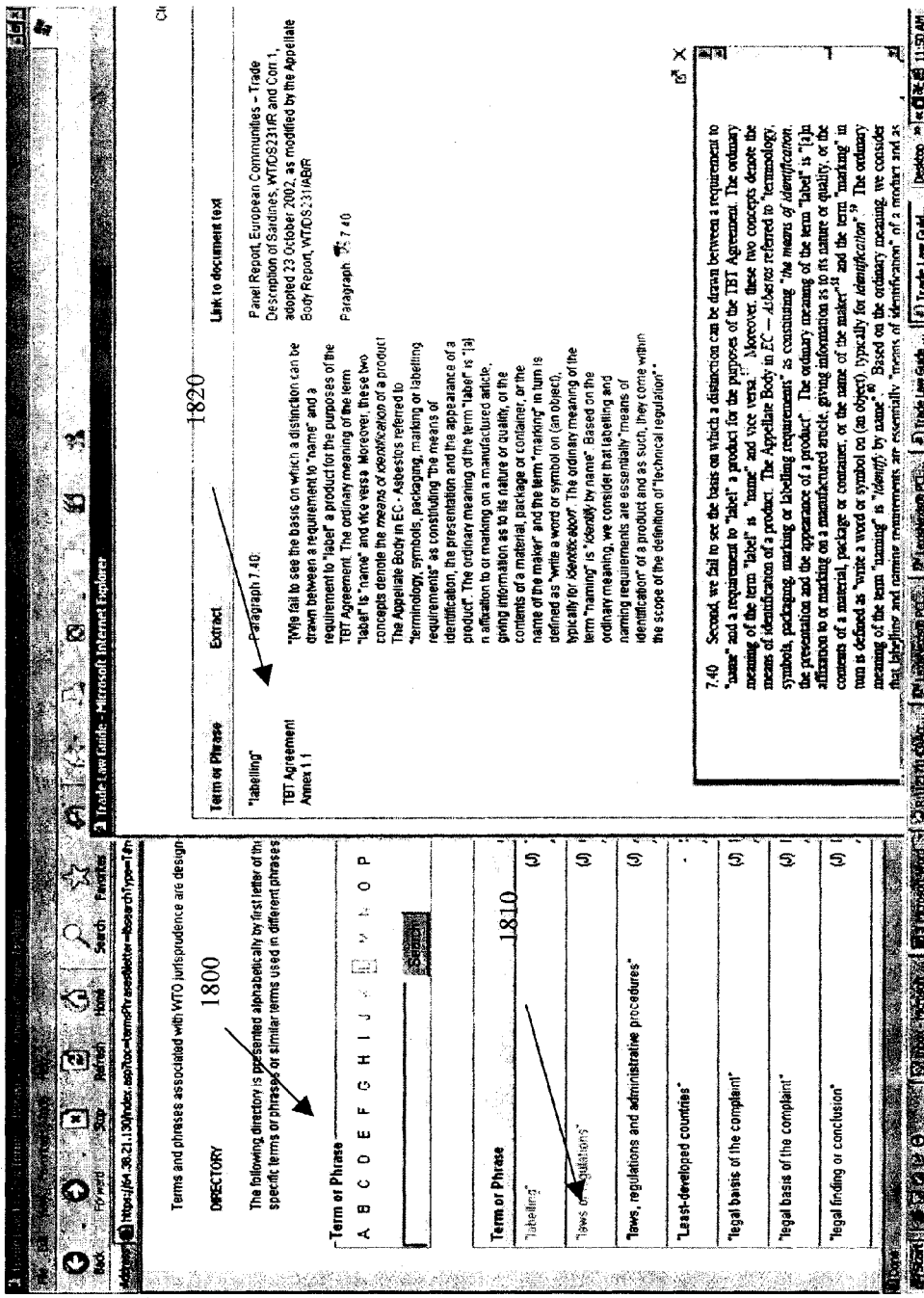

The first heading in the Instrument Annotator 1500, relating to directly cited instruments, is the Instrument Citator 1600 (e.g. see FIG. 16). It will show all other related instruments that cite the section, sub-section, or referenced term. The direct citations, including the title of the instrument and the specific location within the instrument, are related, and thus displayed in the Instrument Citator 1600, by reference to the contextual index. Subsequent selection of an instrument displayed on the Instrument Citator 1600 will result in the display of important information related to the instrument, including (a) a full citation 1610 of the document in question, including source information, important dates, and author (if applicable); (b) text of the surrounding section within the instrument 1630 that contains the issue or reference to the annotated section or referenced term; and (c) a link 1620 for opening an embedded panel 1640 within the Instrument Citator 1600 that contains the PDF version of the instrument. The embedded panel 1640 will open the instrument of interest at the location of the citation and also provides an option for displaying a separate full-screen panel containing only the PDF version of the instrument.

The next heading in the Instrument Annotator is Related Issues 1520. The contextual index relates any other issue which has been related to the section, sub-section, or referenced term in question. This portion of the Instrument Annotator 1500 displays the related issues in a manner similar to Instrument and Issue Navigator. One difference, however, is by selecting any node on a sub-branch ending in an instrument, the Instrument Annotator 1500 displays within the branched list (a) a full citation 1530 of the document in question, including source information, important dates, and author (if applicable); (b) text of the surrounding section within the instrument that contains the issue or reference to the annotated section or referenced term (not shown); and (c) a link 1540 for opening an embedded panel 1510 within the Instrument Annotator 1500 that contains the PDF version of the instrument. The embedded panel 1510 will open the instrument of interest at the location of the cite and also provides an option for displaying a separate full-screen panel containing only the PDF version of the instrument.

The third heading is (c) Historical Connection. By using the contextual index, any documents that were involved in the creation of an annotated document are displayed in branched listing underneath this heading. Again, selection of any instrument in the branched listing under the historical connection section, leads to similar display options as for the Issues heading of the Instrument Annotator. Within the branched list is displayed, within the branched list (a) a full citation of the document in question, including source information, important dates, and author (if applicable); (b) text of the surrounding section within the instrument that contains the issue or reference to the annotated section or referenced term; and (c) a link for opening an embedded panel within the Instrument Annotator that contains the PDF version of the instrument. The embedded panel will open the instrument of interest at the location of the citation and also provides an option for displaying a separate full-screen panel containing only the PDF version of the instrument.

As many of these instruments accessed by way of the Instrument Annotator 1500 may be exceptionally large and cover multiple types of subject matter, the ability for the contextual index to relate issues and instruments to other topics and instruments, as well as specific locations within instruments, allows for the finding of specific information quickly, and avoids wasted effort in reading massive documents in order to determine relevancy.

Major Instrument Overview

This service provides a page for providing an overview of important instruments. It is similar to the Overview of Major Instruments sub-service of the Agreement Annotator Navigator.

Terms and Phrases Navigator

Figure 19:
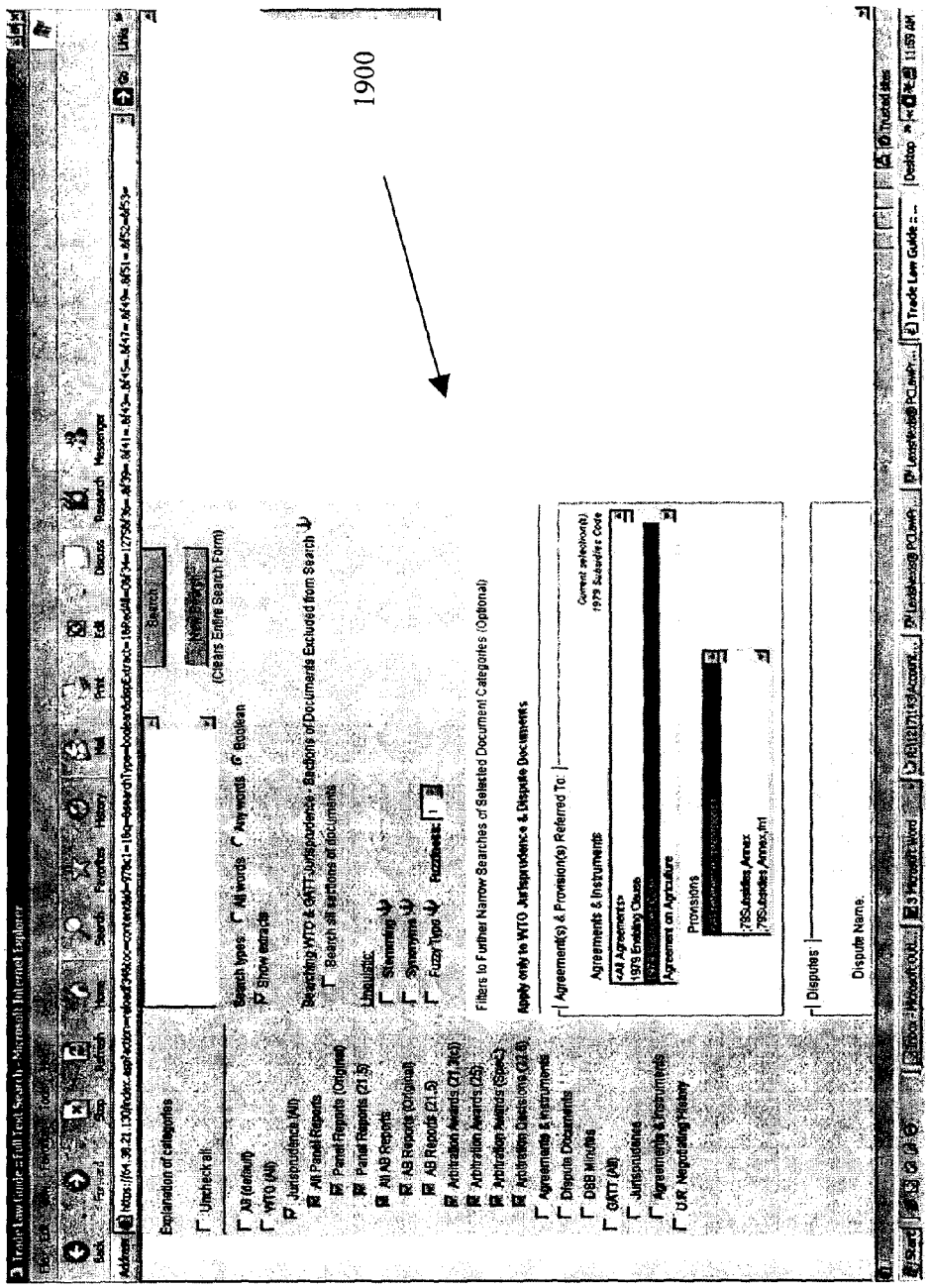

The Terms and Phrases Navigator 1900, for which an example screen shot is shown in FIG. 19, uses the contextual index to review instruments that refer to a term or phrase of interest. This service lists in alphabetical order (e.g. as in list 1910) all terms and phrases of interest that are contained in the contextual index. The ordered list 1910 refers to the location within an instrument in which the term or phrase is used. Each term or phrase in the listing 1910 is hyperlinked. Selection of a hyperlinked term or phrase causes a separate panel to be displayed containing a Terms and Phrases Annotator 1920.

The Terms and Phrases Annotator 1920 contains (a) the exact phrase as found in the instrument, (b) one or more extracts from related instruments, as determined by the contextual index, in which the term or phrase has been used, and (c) links to the instrument in the form of a PDF document, selection of which cause an embedded panel to be displayed in which the document at the location of the extract is shown, and which includes an option for the document to be opened in its own separate panel.

Judgements Citator

The judgements citator provides a listing of decisions handed down by tribunals dealing with issues and conflicts related to international law and the interpretation of international agreements. These can be added by an administrator with minimal user intervention because of the table indexing method and the contextual index. As judgements are continually being made and the development of knowledge is an ongoing process, the ability to add decisions and include all possible relationships without overly cumbersome data entry requirements is critical.

Selection of any judgement causes the display of an Instrument Annotator in respect of that decision. By using the contextual index, related topics, instruments or documents, or historically relevant documents can be accessed in the Instrument Annotator 1500 in a manner similar to that described above with reference to FIG. 15.

Text Searching

Figure 20:
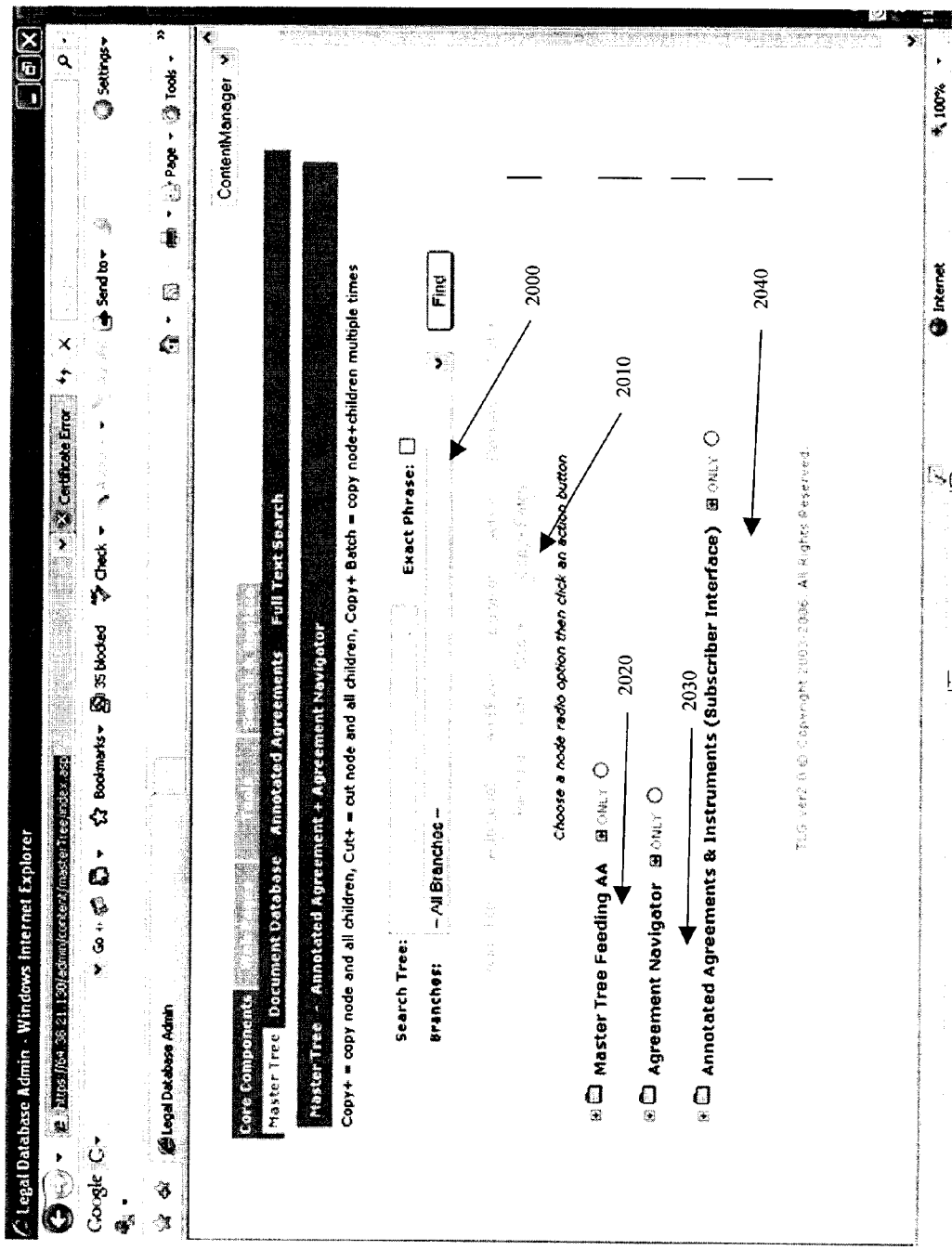

A text searching tool, for which an example screen shot is shown in FIG. 20, provides the ability to search all sources of information for a desired word, phrase, or group of words according to standard boolean search techniques. The search can be restricted to any combination of the different types of sources of information contained on the data storage component, and can also include any data listed in the contextual index. Accordingly, any of the results list can be viewed in the Instrument Annotator 1500 (e.g. see FIG. 15), or by linked to any other topic, instrument, portion of instrument, or historically relevant document that is related as detailed in the contextual index.

Pending Jurisprudence

Given that judicial actions tend to last for long periods of time, material that is publicly available can be added to the data storage component so that users are constantly kept abreast of current updates respecting international law or decisions or actions related to international agreements. Owing to the contextual index and the vertical structure of the data tables of the present embodiment, new information can be added remotely by an administrator with minimal efforts related to data entry, provided the administrator has access to the internet.

Data Source and Relationships Management Editors

The system of the present example further enables a system administrator and/or content owner/provider to input and/or manage data to be accessed by a user of the system. In this example, the set of statements and instructions contained on the service module, when executed by the service module processor, provides a means for supplying the service module and/or authorised user module various displays, as shown in the example screens shots in FIGS. 20 through 28, for inputting data sources and adding, editing, and managing relationships between them. In the embodiments shown in FIGS. 20 to 28, the data source and relationships management tools are called the Master Tree and the Annotated Agreements. It will be appreciated that these and other such terms are examples only and are not meant to be limiting or construed to limit the scope of the present disclosure.

The Master Tree 2000, shown for example in FIG. 20, enables the creation of a matrix of relationships between information sources. In general, the Master Tree 2000 allows an authorised user and/or administrator to create trees and branches that correspond to relationship criteria, relationships between trees and branches that correspond to relationship criteria and run database functions off of such branches. To simplify data upload, the Master Tree 2000 can be divided into three parts that correspond to services provided by the embodiment in FIGS. 20 to 28: (i) Master Tree Feeding Annotated Agreements folder 2020; (ii) Agreement Navigator folder 2030; and (iii) Annotated Agreements & Instruments (Subscriber Interface) folder 2040. In this example, the controls 2010 for managing relationships will not function until one of these services in selected.

Figure 21:
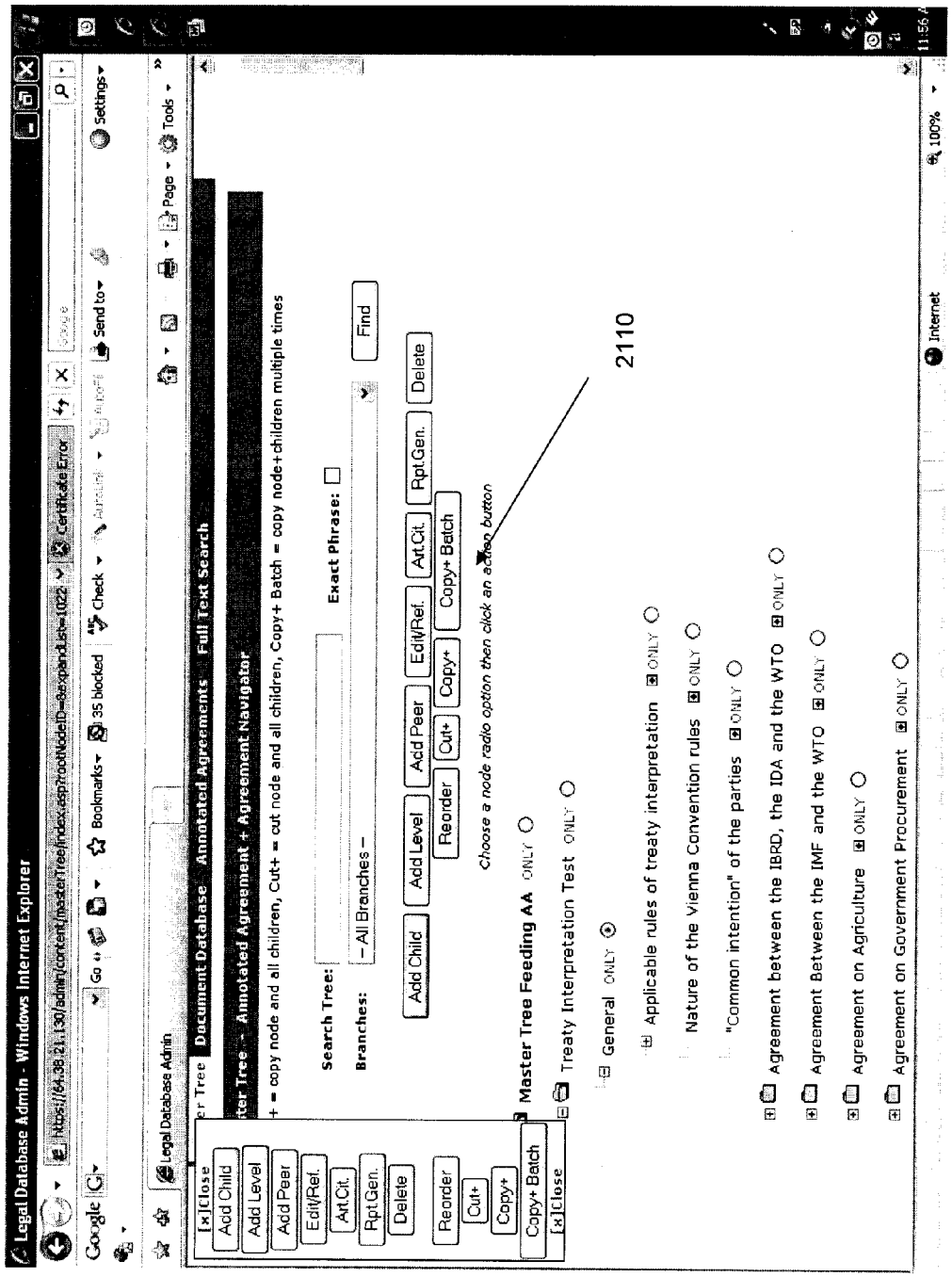

Upon selection of a service, such as the Master Tree Feeding Annotated Agreements folder 2020, the data source and relationship management controls become available as shown in FIG. 21. Please note that there are stationary controls 2110 and floating controls 2120, which both accomplish the same function but the floating controls move for the convenience of a user. The controls can be described as follows: (i) Add Child—add a sub-category of a relationship; (ii) Add Level—move all sub-categories under a newly created single parent relationship category; (iii) Add Peer—add another relationship category on the same level as that selected immediately following the relationship category selected; (iv) Edit/Ref.—Edit the content of a relationship category; (v) Article Citator—run the article citator program; (vi) Rpt. Gen—generate a report using data from the information source database; (vii) Delete—delete a relationship category and all of its relationship sub-categories; (viii) Re-order—change the order of relationship categories or relationship sub-categories; (ix) Cut—cut & paste relationship categories, associated relationship sub-categories and associated database functions; (x) Copy—copy & paste relationship categories, associated relationship sub-categories and associated database functions; and (xi) Copy+Batch—copy a single entry as per (x) and then paste in multiple places.

Figure 22:
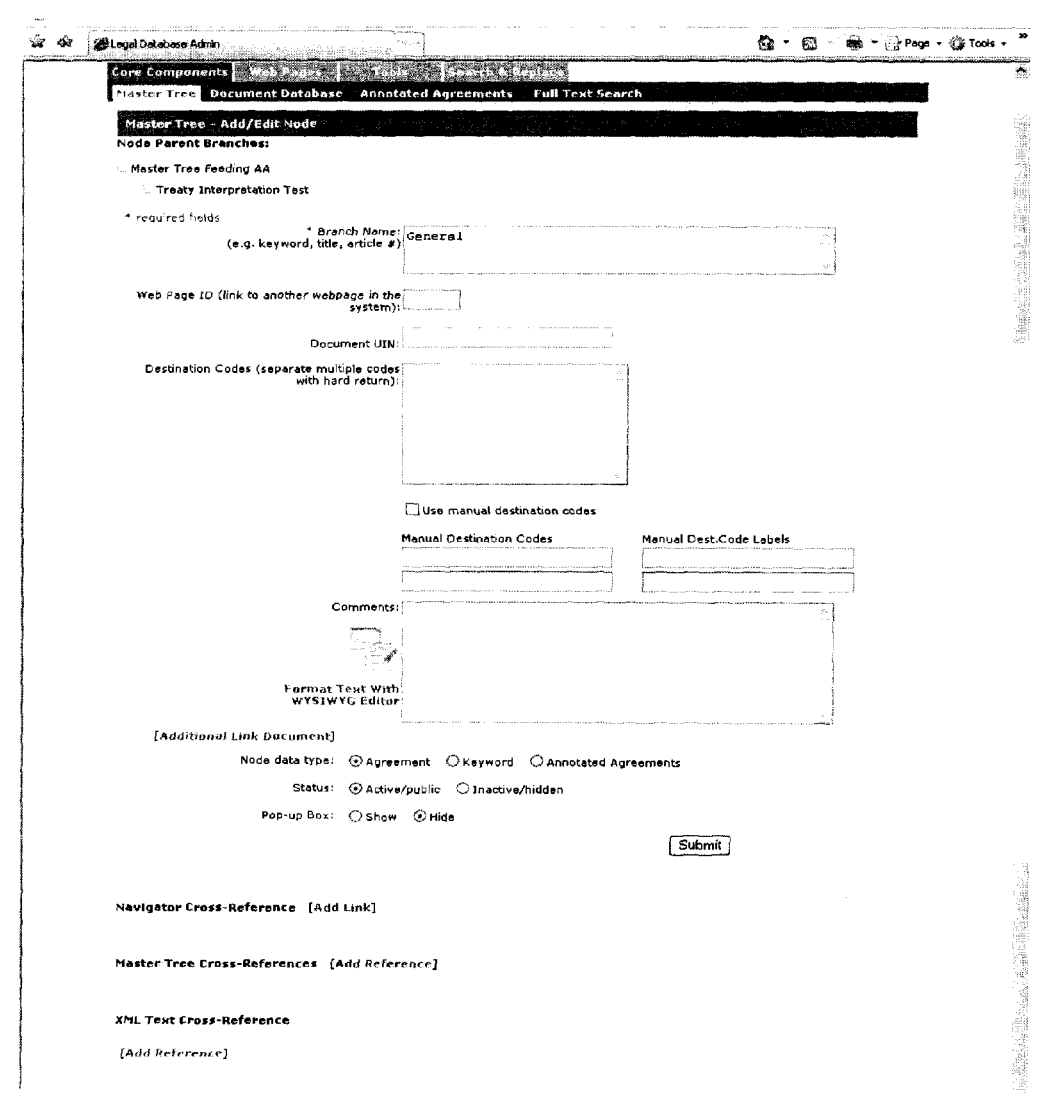

In the present embodiment, the Branch Fields and Functions, as shown in FIG. 22, provides for selecting via the service module display a descriptor for relationship criteria or category, creating a link to another data source or web page, creation of any number of destination codes that direct the link to particular destinations within any number of data sources, creation of labels or descriptors for within-data source destinations, pop-up descriptors above and beyond the branch category descriptor, and service cross-referencing, contextual index cross-referencing, and XML-text cross-referencing for creating relationships between relationship categories.

Figure 24:
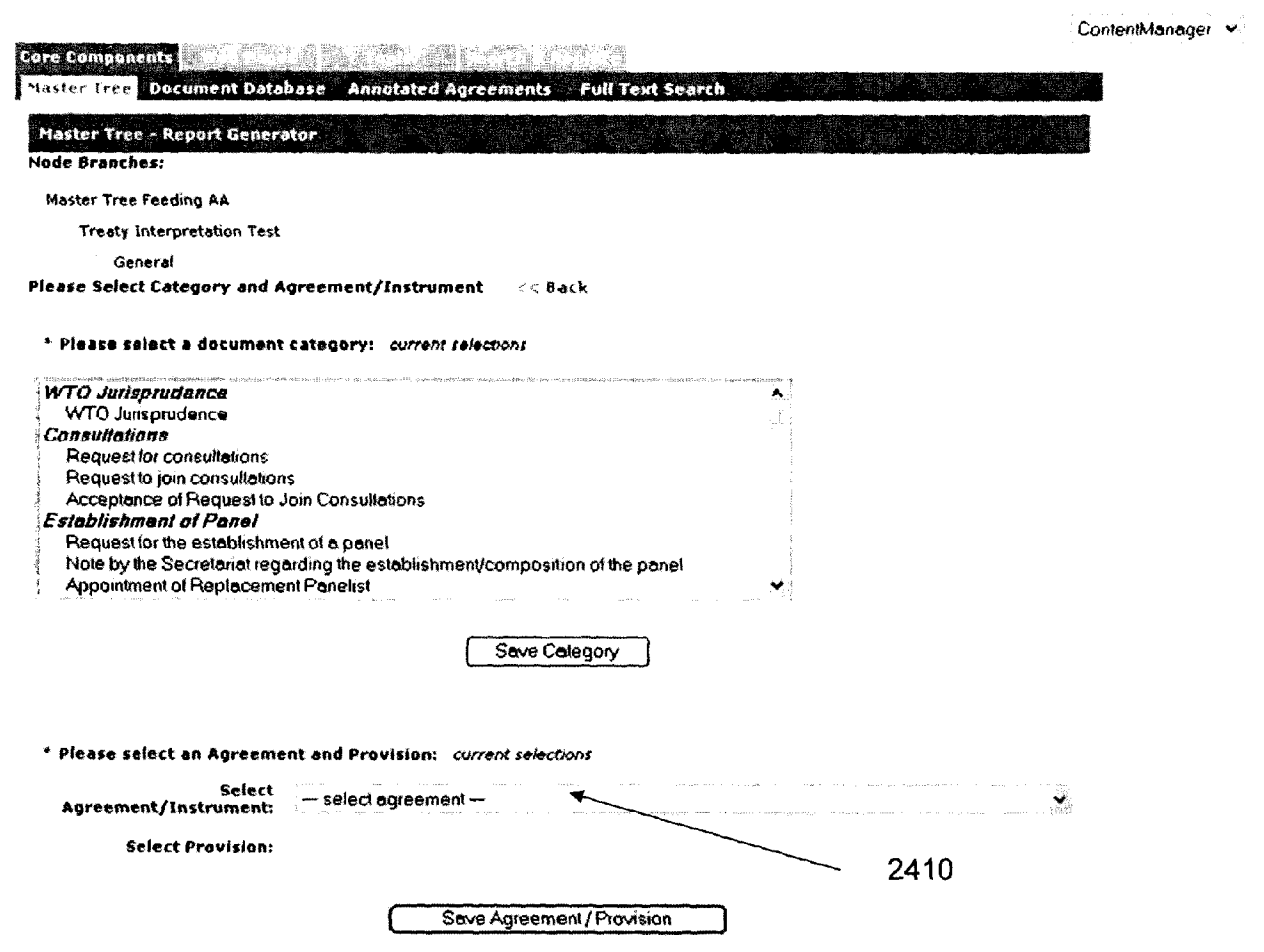

FIG. 23 shows example means for selecting all relationships that relate to a particular information source. This functionality is available on both the service module and user module displays, however on the service module, there is provided means for adding, changing, or deleting the relationships. FIG. 24 shows another example means for creating relationship categories available on the service module, as it provides for the selection of the data source category (or the creation of a new one), after which data sources that fit within those categories may be selected from a list 2410 of all data sources that have been stored on the data storage medium.

Data corresponding to data sources, destination codes, and relationship categories and sub-categories that are created in the Master Tree Feeding Annotated Agreements is not automatically available for display by user modules. The Annotated Agreements function, shown in FIG. 25, must be used to create links between XML texts of documents that are annotated and the relevant part of the Master Tree Feeding Annotated Agreements. The function enables a user to edit the XML text and insert data that delineates annotation links to other data sources, other locations within data sources, and other relationship categories. The link can be viewed, deleted, edited, or annotated with commentary.

Figure 26A:
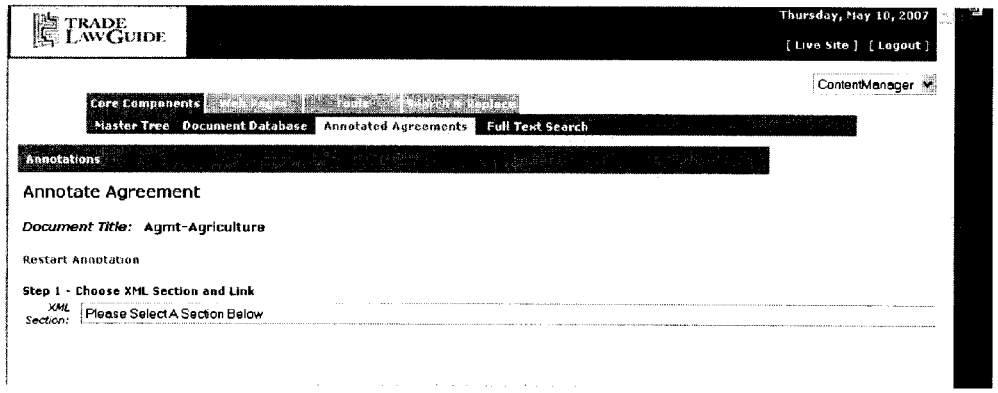
Figure 26B:
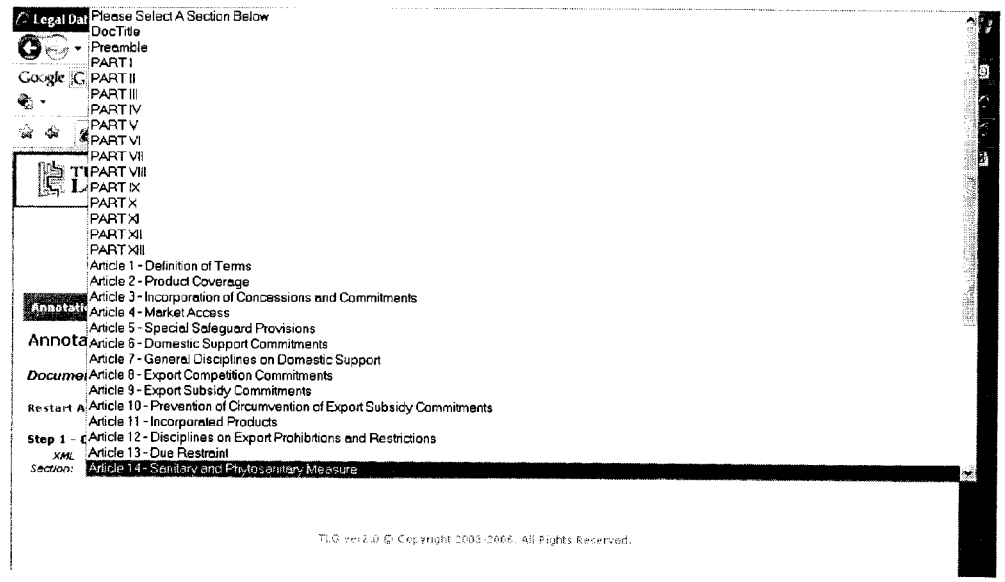
Figure 27A:
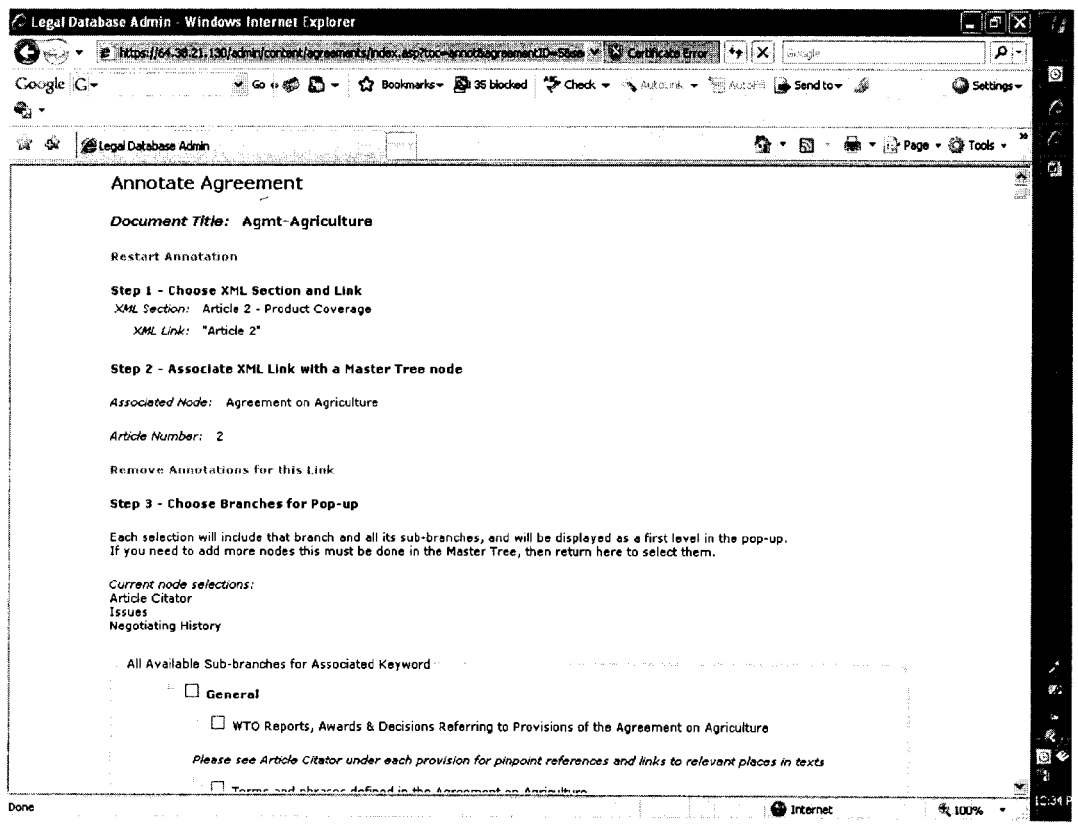
Figure 27B:
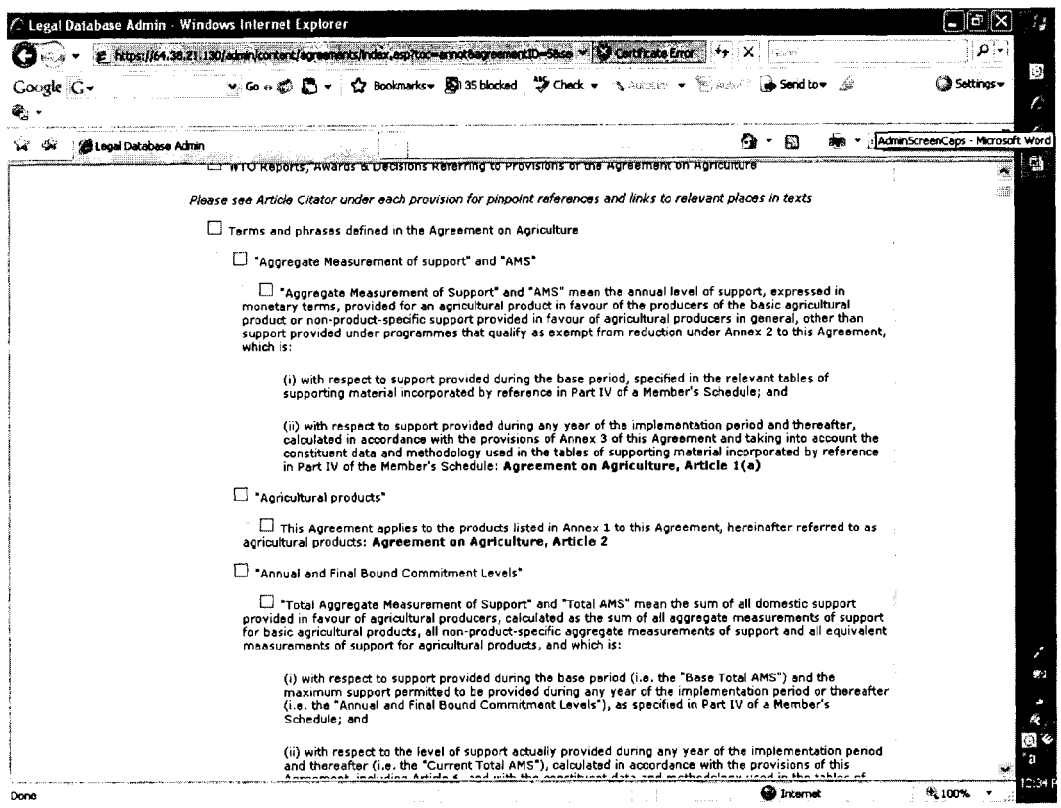

Links to be established between codes in the XML text are displayed in a drop-down menu, as shown in FIGS. 26A and 26B, as are parts of the branches of the Master Tree corresponding to relationship categories. Where links are established, the selected branches will be available for display by user modules when the annotation is clicked on. When links are selected on the service module display and interface, the relevant part of the Master Tree becomes available on the user module according to choices made at the service module (see FIGS. 27A and 27B).

Figure 28:
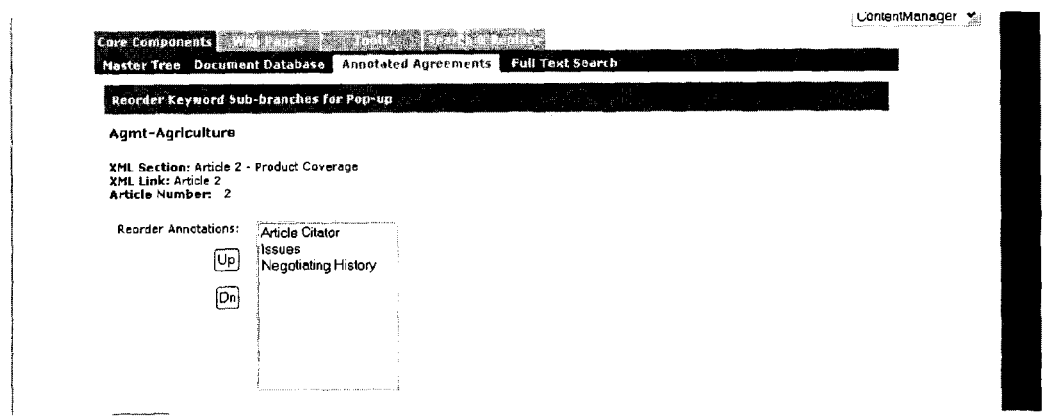

In addition, the order of display of data sources and relationships, within categories of relationships, can also be changed, as shown in FIG. 28.

The foregoing embodiments of the invention are examples and can be varied in many ways. Such present or future variations are not to be regarded as a departure from the spirit and scope of the invention, and all such modifications as would be apparent to one skilled in the art are intended to be included within the scope of the following claims.

The disclosure of all patents, publications, including published patent applications, and database entries referenced in this specification are specifically incorporated by reference in their entirety to the same extent as if each such individual patent, publication, and database entry were specifically and individually indicated to be incorporated by reference.

The embodiments of the invention for which an exclusive property or privilege is claimed are defined as follows:

1. A system for providing a user module access to interrelated sources of information pertaining to a given subject, the system comprising:
　a service module comprising:
　　a processor;
　　at least one computer readable media for storing thereon a data structure comprising a plurality of data tables for storing the interrelated sources of information;
　　a contextual index for associating the interrelated sources of information based on at least one pre-existing interrelation between interrelated sources of information; and
　　a set of statements and instructions, where, upon execution by the processor, provides for the association of, and access to the-interrelated sources of information; and
　　a communication interface for interfacing with the user module and providing thereto access to the associated interrelated sources of information via the contextual index; and
　wherein the contextual index comprises criteria defining at least one relationship between the interrelated sources of information wherein the interrelated sources of information are thereby associated based on the criteria;
　wherein at least one of the criteria is selected from the group consisting of:
　subject topic, issue related to the subject, keywords, title of information source, sub-title of information source, historical significance of information source, topics, document types, citations, and references;
　wherein at least one of the interrelated sources of information is configured for visual presentation in a plurality of ways; and
　wherein the system is configured to provide at least one annotation to at least one of the interrelated sources of information, each of the at least one annotation defining a link to another of the interrelated sources of information.

2. The system as claimed in claim 1, wherein said service module and the user module are distinct computing platforms communicatively coupled via a communication network.

3. The system as claimed in claim 1, wherein the contextual index provides an interconnectivity map for the interrelated sources of information or a route between interrelated sources of information.

4. The system as claimed in claim 1, wherein the system is configured at least in part to perform least one of the operations selected from the group consisting of:
　organizing the interrelated sources of information, sorting two or more of the interrelated sources of information, searching the interrelated sources of information, navigating the interrelated sources of information, and navigating locations within the interrelated sources of information.

5. The system as claimed in claim 1, wherein the data structure is searchable using the contextual index.

6. The system as claimed in claim 1, wherein the system is configured to facilitate viewing of one of said interrelated sources of information in a context defined by another of said interrelated sources of information.

7. The system as claimed in claim 1, wherein at least one of the plurality of ways is selected from the group consisting of:
　a hierarchical listing with portions of information from the interrelated sources of information on each branch, embedded panels containing all or portions of the interrelated sources of information, and separate panels each panel showing only a desired interrelated source of information.

8. The system as claimed in claim 1, wherein the data structure is organized relationally, thereby facilitating linkage and location identification of the interrelated sources of information.

9. The system as claimed in claim 1, wherein said plurality of data tables is configured in a vertical arrangement or wherein said plurality of data tables is indexed using mapped fields or wherein said plurality of data tables comprises a nested table.

10. The system as claimed in claim 1, wherein said data structure comprises a relational database.

11. The system as claimed in claim 1, wherein the given subject pertains to law.

12. The system as claimed in claim 11, wherein the given subject pertains to international law or international trade law.

13. The system as claimed in claim 11, wherein the interrelated sources of information include information selected from the group comprising:
　court interpretations, tribunal interpretations, legal judgements, pending jurisprudence, agreements, disputes, findings related to disputes and negotiations, treaties, annotated treaties, cases, findings, and negotiations.

14. The system as claimed in claim 11, wherein the system is configured to provide access to the interrelated sources of information using one or more services selected from the group comprising:
　a branched listing of instrument titles and related topics, a branched listing of annotated instruments sorted by topic or title, a branched listing of terms and phrases referenced by instruments, a sorted listing of citations related to international legal judgements, a text searching tool for searching the interrelated sources of information, and a report of pending jurisprudence.

15. The system as claimed in claim 1, wherein the given subject pertains to one or more subjects selected from the group comprising:
　medicine, medical diagnosis, business, and economics.

16. A method for providing a user module access to interrelated sources of information pertaining to a given subject, the method comprising:
　storing a data structure comprising: a plurality of interrelated sources of information; and
　a contextual index comprising associations of the interrelated sources of information based on at least one pre-existing interrelation between interrelated sources of information;
　interfacing with the user module to provide access to the associated interrelated sources of information via the contextual index;
　visually presenting at least one of the interrelated sources of information in at least one of a plurality of ways; and
　providing at least one annotation to at least one of the interrelated sources of information, each of the at least one annotation defining a link to another of the interrelated sources of information wherein the contextual index comprises criteria defining at least one relationship between the interrelated sources of information, wherein the interrelated sources of information are thereby associated based on the criteria;

wherein at least one of the criteria is selected from the group consisting of: subject topic, issue related to the subject, keywords, title of information source, sub-title of information source, historical significance of information source, topics, document types, citations, and references.

17. The method as claimed in claim 16, the method further comprising:

providing an interconnectivity map for the interrelated sources of information or a route between interrelated sources of information.

18. The method as claimed in claim 16, the method further comprising performing one or more operations selected from the group comprising:

organizing the interrelated sources of information, sorting two or more of the interrelated sources of information, searching the interrelated sources of information, navigating the interrelated sources of information, and navigating locations within the interrelated sources of information.

19. The method as claimed in claim 16, the method further comprising searching the data structure using the contextual index.

20. The method as claimed in claim 16, the method further comprising presenting one of said interrelated sources of information in a context defined by another of said interrelated sources of information.

21. The method as claimed in claim 16, wherein the at least one of the plurality of ways is selected from the group consisting of:

a hierarchical listing with portions of information from the interrelated sources of information on each branch, embedded panels containing all or portions of the interrelated sources of information, and separate panels each panel showing only a desired interrelated source of information.

22. The method as claimed in claim 16, further comprising organizing the data structure relationally, thereby facilitating linkage and location of the interrelated sources of information.

23. The method as claimed in claim 16, further comprising configuring said plurality of data tables in a vertical arrangement or indexing said plurality of data tables using mapped fields or configuring at least a portion of said plurality of data tables as a nested table.

24. The method as claimed in claim 16, further comprising storing said data structure as a relational database.

25. The method as claimed in claim 16, wherein the given subject pertains to law.

26. The method as claimed in claim 25, wherein the given subject pertains to international law or international trade law.

27. The method as claimed in claim 25, wherein the interrelated sources of information include information selected from the group comprising:

court interpretations, tribunal interpretations, legal judgements, pending jurisprudence, agreements, disputes, findings related to disputes and negotiations, treaties, annotated treaties, cases, findings, and negotiations.

28. The method as claimed in claim 25, further comprising providing access to the interrelated sources of information using one or more services selected from the group comprising:

a branched listing of instrument titles and related topics, a branched listing of annotated instruments sorted by topic or title, a branched listing of terms and phrases referenced by instruments, a sorted listing of citations related to international legal judgements, a text searching tool for searching the interrelated sources of information, and a report of pending jurisprudence.

29. The method as claimed in claim 16, wherein the given subject pertains to one or more subjects selected from the group comprising:

medicine, medical diagnosis, business, and economics.

* * * * *